US012611866B2

(12) United States Patent
Aruga et al.

(10) Patent No.: US 12,611,866 B2
(45) Date of Patent: Apr. 28, 2026

(54) RECORDING APPARATUS

(71) Applicant: SEIKO EPSON CORPORATION, Tokyo (JP)

(72) Inventors: Sho Aruga, Chino (JP); Tomoya Kurashina, Shiojiri (JP); Nobuhiko Shinozaki, Okaya (JP); Soshi Okawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 18/621,891

(22) Filed: Mar. 29, 2024

(65) Prior Publication Data

US 2024/0326440 A1 Oct. 3, 2024

(30) Foreign Application Priority Data

Mar. 30, 2023 (JP) ................................ 2023-054848

(51) Int. Cl.
*B41J 2/165* (2006.01)
*B41J 11/00* (2006.01)

(52) U.S. Cl.
CPC ....... *B41J 2/16535* (2013.01); *B41J 2/16507* (2024.05); *B41J 2/16538* (2013.01); *B41J 2/16544* (2013.01); *B41J 11/0095* (2013.01)

(58) Field of Classification Search
CPC B41J 2/16535; B41J 2/16507; B41J 2/16538; B41J 2/16544; B41J 11/0095
See application file for complete search history.

(56) References Cited

U.S. PATENT DOCUMENTS

2005/0058495 A1 3/2005 Sakai
2013/0265361 A1* 10/2013 Yatsunami ............ B41J 29/393 347/19

FOREIGN PATENT DOCUMENTS

JP 2005-096991 A 4/2005

* cited by examiner

*Primary Examiner* — Geoffrey S Mruk
(74) *Attorney, Agent, or Firm* — WORKMAN NYDEGGER

(57) ABSTRACT

A recording apparatus includes a liquid ejection head including a plurality of nozzles configured to eject a liquid onto a medium, the liquid ejection head being elongated in a medium width direction that is a direction intersecting a medium transport direction, a facing portion disposed to face the liquid ejection head, and a wiper configured to wipe a head surface of the liquid ejection head while moving in the medium width direction, and the wiper is provided on a wiper carriage that moves in the medium width direction using power from a first motor, and an edge detection unit for detecting an edge of the medium is included at a position facing the facing unit in the wiper carriage.

6 Claims, 35 Drawing Sheets

RECORDING APPARATUS

The present application is based on, and claims priority from JP Application Serial Number 2023-054848, filed Mar. 30, 2023, the disclosure of which is hereby incorporated by reference herein in its entirety.

BACKGROUND

1. Technical Field

The present disclosure relates to a recording apparatus that performs recording on a medium.

2. Related Art

A printer described in JP-A-2005-096991 is a serial type printer, and includes a paper width detection sensor in a carriage including a printing head. A paper width is detected by the paper width detection sensor provided in the carriage by using a movement operation of the carriage.

In the serial type printer, the paper width detection sensor can be mounted in the carriage including the printing head as described above, but in a printer including a line head in which ink ejection nozzles are provided over an entire region in a paper width direction, the line head is fixed and does not move, and thus, it is necessary to provide a dedicated carriage for mounting a paper width detection sensor, which leads to an increase in size and cost of the apparatus.

SUMMARY

A recording apparatus of the present disclosure for solving the problem includes a liquid ejection head including a plurality of nozzles configured to eject a liquid onto a medium, the liquid ejection head being elongated in a medium width direction that is a direction intersecting a medium transport direction, a facing portion disposed to face the liquid ejection head, and a wiper configured to wipe a head surface of the liquid ejection head while moving in the medium width direction, wherein the wiper is provided on a wiper carriage that moves in the medium width direction using power from a first motor, and an edge detection unit for detecting an edge of the medium is included at a position facing the facing unit in the wiper carriage.

DESCRIPTION OF EMBODIMENTS

Figure 1:
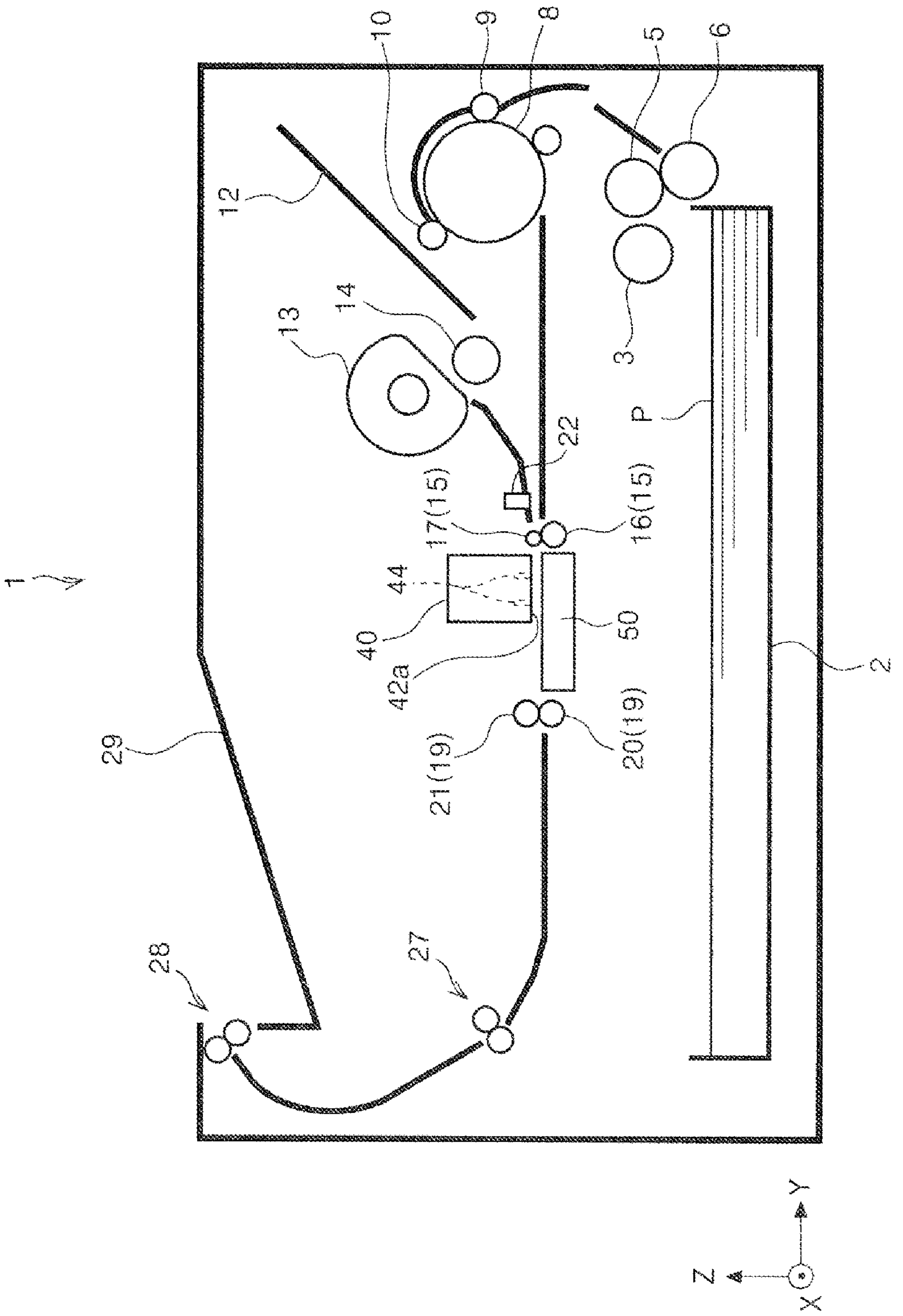
FIG. 1 is a view illustrating an entire medium transport path of a printer.

Hereinafter, the present disclosure will be schematically described.

A recording apparatus according to a first aspect includes a liquid ejection head including a plurality of nozzles configured to eject a liquid onto a medium, the liquid ejection head being elongated in a medium width direction that is a direction intersecting a medium transport direction, a facing portion disposed to face the liquid ejection head, and a wiper configured to wipe a head surface of the liquid ejection head while moving in the medium width direction, wherein the wiper is provided on a wiper carriage that moves in the medium width direction using power from a first motor, and an edge detection unit for detecting an edge of the medium is included at a position facing the facing unit in the wiper carriage.

According to the present aspect, since the wiper configured to wipe the head surface of the liquid ejection head while moving in the medium width direction is provided on the wiper carriage that moves in the medium width direction according to a power of a driving source, and the edge detection unit for detecting the edge of the medium is included at the position facing the facing unit in the wiper carriage, a dedicated configuration for moving the edge detection unit in the medium width direction is not required, and an increase in size and cost of the apparatus can be curbed.

A second aspect is an aspect according to the first aspect, wherein the liquid ejection head is movable in a direction in which the liquid ejection head moves forward and backward with respect to the facing portion using power from a second motor, a movement region of the liquid ejection head includes a recording position at which recording is performed on the medium, and a wiping position that is a position spaced apart from the facing portion as compared to the recording position and at which the head surface is wiped by the wiper, and a control unit configured to control the first motor and the second motor drives the first motor and performs edge detection using the edge detection unit in a state in which the liquid ejection head is positioned at the wiping position.

According to the present aspect, since the wiping of the head surface by the wiper and the edge detection using the edge detection unit are simultaneously performed, it is possible to improve a recording throughput.

A third aspect is an aspect according to the first aspect, wherein the liquid ejection head is movable in a direction in which the liquid ejection head moves forward and backward with respect to the facing portion using power from a second motor, a movement region of the liquid ejection head includes a recording position at which recording is performed on the medium, a wiping position that is a position spaced apart from the facing portion as compared to the recording position and at which the head surface is wiped by the wiper, and a position spaced apart from the facing portion as compared to the wiping position, the position being a spaced position at which the wiper is movable in the medium width direction in a state in which the wiper is spaced apart from the head surface, and a control unit configured to control the first motor and the second motor drives the first motor and performs edge detection using the edge detection unit in a state in which the liquid ejection head is positioned at the spaced position.

According to the present aspect, since the control unit drives the first motor and performs the edge detection using the edge detection unit in a state in which the liquid ejection head is positioned at the spaced position, a load due to contact between the wiper and the head surface is not applied to the first motor when the edge detection is performed, and it is possible to perform the edge detection with high accuracy.

A fourth aspect is an aspect according to the third aspect, wherein the control unit moves the liquid ejection head from the recording position to the wiping position or the spaced position before the medium is transported to a position at which the medium faces the edge detection unit when the edge detection using the edge detection unit is performed.

According to the present aspect, since the control unit moves the liquid ejection head from the recording position to the wiping position or the spaced position before the medium is transported to a position at which the medium faces the edge detection unit when the edge detection using the edge detection unit is performed, it is possible to improve a printing throughput as compared to a case in which the liquid ejection head is moved from the recording position to the wiping position or the spaced position after the medium is transported to the position at which the medium faces the edge detection unit.

A fifth aspect is an aspect according to the first aspect, the recording apparatus including: a cap portion configured to cover the head surface, wherein an opening portion is formed in the facing portion, the cap portion is disposed at a position that is on the inner side of the opening portion and that faces the head surface, the liquid ejection head is movable in a direction in which the liquid ejection head moves forward and backward with respect to the facing portion using power from a second motor, and a movement region of the liquid ejection head includes a recording position at which recording is performed on the medium, and a cap position at which the head surface is covered by the cap portion.

According to the present aspect, since the movement region of the liquid ejection head movable in the direction in which the liquid ejection head moves forward and backward with respect to the facing portion according to the power of the second motor includes the recording position at which the recording is performed on the medium, and the cap position at which the head surface is covered by the cap portion, a drive source for driving the cap portion is not required, and an increase in the size and cost of the apparatus can be curbed.

A sixth aspect is an aspect according to the fifth aspect, wherein the liquid ejection head includes an abutting portion configured to abut on the facing portion, the facing portion is displaceable along a movement direction of the liquid ejection head and is pressed toward the liquid ejection head by a pressing member, and the liquid ejection head is caused to abut on the facing portion at the abutting portion in a process in which the liquid ejection head moves from the recording position to the cap position, and moves the facing portion against a pressing force of the pressing member.

When the facing portion is used as a support means for supporting the medium and the opening portion formed in the facing portion is large, there is concern that the medium may enter the opening portion, and therefore, it is preferable to make the opening portion as small as possible. However, when the opening portion is made small, the facing portion interferes with the liquid ejection head when the cap portion covers the head surface, and there is a problem in that the cap portion cannot cover the head surface.

Therefore, in the present aspect, the facing portion is made displaceable along the movement direction of the liquid ejection head, and is pressed toward the liquid ejection head by the pressing member. The liquid ejection head is configured to abut on the facing portion due to the abutting portion in a process in which the liquid ejection head moves from the recording position to the cap position, and move the facing portion against the pressing force of the pressing member. Accordingly, when the cap portion covers the head surface, the facing portion does not become an obstacle, the opening portion can be made small, and entrance of the medium into the opening portion can be curbed when the facing portion is used as the support means.

Hereinafter, the present disclosure will be specifically described.

Hereinafter, an inkjet printer 1 will be described as an example of a recording apparatus that performs recording on a medium. Hereinafter, the inkjet printer 1 is simply referred to as a printer 1.

In an X-Y-Z coordinate system illustrated in each figure, an X-axis direction is an apparatus width direction and is a width direction of a medium on which recording is performed. When viewed from an operator of the printer 1, a +X direction is on the left side and a −X direction is on the right side.

A Y-axis direction is an apparatus depth direction, and is a direction along a medium transport direction at the time of the recording. A +Y direction is a direction from a back surface to a front surface of the apparatus, and a −Y direction is a direction from the front surface to the back surface of the apparatus. In the present embodiment, the side surface in the +Y direction among side surfaces constituting the periphery of the printer 1 is the front surface of the apparatus, and the side surface in the −Y direction is the back surface of the apparatus.

A Z-axis direction is a direction along a vertical direction, and is an apparatus height direction. A +Z direction is a vertically upward direction, and a −Z direction is a vertically downward direction.

Hereinafter, a direction in which the medium is sent may be referred to as “downstream”, and a direction opposite thereto may be referred to as “upstream”.

Hereinafter, a medium transport path of the printer 1 will be described with reference to FIG. 1. As illustrated in FIG. 1, the printer 1 includes a medium accommodation cassette 2 which is an example of a medium accommodation portion, at a bottom portion of the apparatus. Reference sign P denotes a medium accommodated in the medium accommodation cassette 2. An example of the medium includes a recording sheet. The medium accommodation cassette 2 is provided detachably on a front side of the apparatus.

A pick roller 3 driven by a motor (not illustrated) is provided above the medium accommodation cassette 2. The pick roller 3 can move forward and backward with respect to the medium accommodated in the medium accommodation cassette 2, and rotates in contact with the medium stored in the medium accommodation cassette 2 to feed the medium in the +Y direction from the medium accommodation cassette 2.

A feeding roller 5 driven by a motor (not illustrated) and a separation roller 6 to which a rotational torque is applied by a torque limiter (not illustrated) are provided downstream of the medium accommodation cassette 2. The medium fed from the medium accommodation cassette 2 is separated by being nipped between the feeding roller 5 and the separation roller 6, and is further fed downstream.

A reversing roller 8 driven by a motor (not illustrated) is provided downstream of the feeding roller 5 and the separation roller 6. A first nip roller 9 and a second nip roller 10 are provided around the reversing roller 8, and the medium is nipped by the reversing roller 8 and the first nip roller 9, further nipped by the reversing roller 8 and the second nip roller 10, and transported. The transport direction of the medium is reversed from the +Y direction to the −Y direction by the reversing roller 8, and the medium is transported downstream.

A first transport roller pair 15 including a drive roller 16 driven by a motor (not shown) and a driven roller 17 that is rotatable in a driven manner is provided downstream of the reversing roller 8. The medium is transported to a position facing the line head 40 by the first transport roller pair 15.

The printer 1 includes a medium feeding path from the medium support portion 12, in addition to the medium feeding path from the medium accommodation cassette 2. The medium support portion 12 supports the medium in an inclined posture, and the supported medium is transported to the first transport roller pair 15 by the feeding roller 13 driven by a motor (not illustrated). Reference sign 14 denotes a separation roller to which rotational torque is applied by a torque limiter (not illustrated).

A medium detection unit 22 is provided upstream of the first transport roller pair 15. A control unit 80 (see FIG. 5) to be described below can determine the position of a leading end of the medium with respect to the line head 40 or an edge detection unit 38 to be described below based on detection information of the medium detection unit 22, and can position the medium at a recording start position, for example.

The line head 40 is an example of a liquid ejection head that ejects ink, which is an example of liquid, onto a medium for recording. The line head 40 is a liquid ejection head in which a plurality of nozzles 44 for ejecting ink are disposed to cover an entire region in the medium width direction. The line head 40 is configured as an ink ejection head that is elongated in a medium width direction and is capable of recording over an entire region in the medium width direction without moving in the medium width direction.

Reference sign **42*a* denotes a head surface that is a surface that faces the medium. The head surface 42*a* can also be referred to as a liquid ejection surface or a nozzle surface. The head surface 42*a* is formed by a plate member 42** to be described below.

The printer 1 includes an ink storage unit (not illustrated), and the ink ejected from the line head 40 is supplied from the ink storage unit to the line head 40 via an ink tube (not illustrated).

A facing portion 50 is provided at a position facing the head surface **42*a* of the line head 40. The facing portion 50 according to the present embodiment prescribes a gap between the medium and the head surface 42*a* by supporting the medium. Hereinafter, the gap between the medium and the head surface 42*a*** may be referred to as a platen gap.

The line head 40 is provided to be movable in a direction in which the line head 40 moves forward and backward with respect to the facing portion 50, that is, in a direction in which the platen gap is adjusted. In the present embodiment, the direction in which the platen gap is adjusted is parallel to the Z-axis direction. Hereinafter, movement of the line head 40 in the +Z-axis direction may be referred to as “upward movement”, and movement of the line head 40 in the −Z-axis direction may be referred to as “downward movement”.

Figure 5:
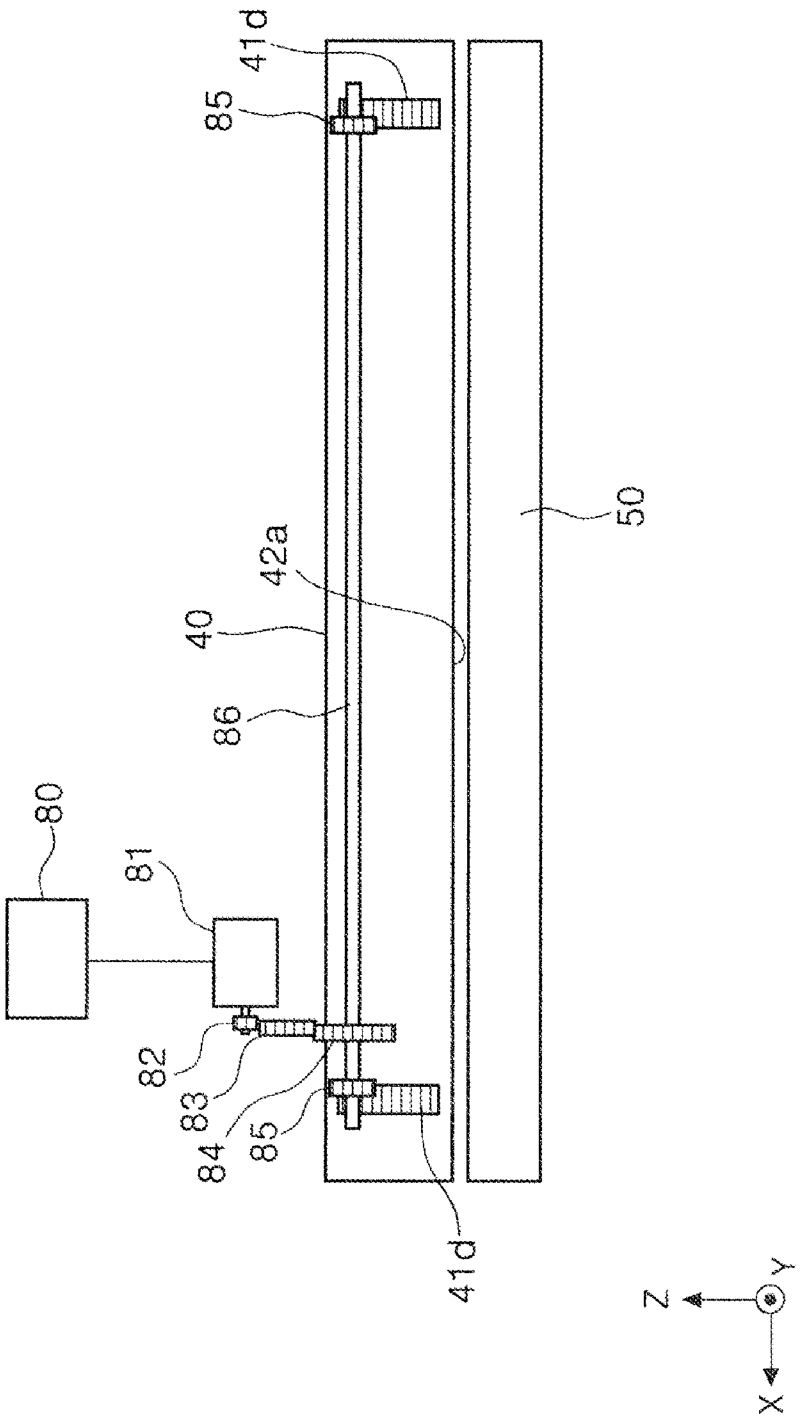
FIG. 5 is a view illustrating a driving mechanism for driving a line head.

FIG. 5 illustrates a mechanism for adjusting the platen gap, reference sign 81 denotes a head movement motor which is a driving source for moving the line head 40 up and down, and reference sign 80 denotes a control unit for controlling the head movement motor 81. The control unit 80 is a control unit that controls the entire printer 1.

A motor gear 82 is provided in a motor shaft of the head movement motor 81, and the motor gear 82 transmits a driving force to a pinion gear 85 via a gear 83. The pinion gear 85 is fixed to a shaft 86.

The line head 40 is held to be displaceable in the Z-axis direction by a guide member (not illustrated). A rack portion **41*d* is formed along the Z-axis direction in the line head 40, and the pinion gear 85 meshes with the rack portion 41***d* to constitute a rack and pinion mechanism.

The pinion gear 85 is provided in a shaft 86, and the pinion gear 85 is rotated by the rotation of the head movement motor 81, so that the line head 40 moves upward and downward.

The rack and pinion mechanism constituted by the rack portion 41*d* and the pinion gears 85 is provided in the vicinity of both end portions of the line head 40 in the medium width direction.

When the line head 40 moves upward, the line head 40 abuts on an upward movement regulation portion (not illustrated), and further upward movement is regulated. The control unit 80 detects an increase in a motor driving current value when the line head 40 abuts on the upward movement regulation portion, to ascertain that the line head 40 is located at an upward movement limit position.

Further, the head movement motor 81 is provided with an encoder sensor (not illustrated), and the control unit 80 can detect an amount of rotation of the head movement motor 81. Accordingly, the control unit 80 can detect an amount of movement of the line head 40 from the upward movement limit position, that is, can ascertain the current position of the line head 40.

Based on a medium type included in received printing data, the control unit 80 moves the line head 40 up and down according to a thickness of the medium and adjusts the platen gap. For example, assuming that a position of the line head 40 when recording is performed on plain paper is a first recording position, when recording is performed on special paper thicker than the plain paper, the line head 40 is positioned at a second recording position higher than the first recording position.

A movement region of the line head 40 includes a cap position which is a position when the line head 40 is capped by a cap portion 61 to be described below, and a wiping position which is a position when the head surface 42*a* is wiped by a wiper 36 to be described below, in addition to the plurality of recording positions as described above.

In the present embodiment, the above-described positions of the line head 40 are the cap position, the first recording position, the second recording position, and the wiping position in order in the +Z direction.

Referring back to FIG. 1, a second transport roller pair 19 including a driving roller 20 driven by a motor (not illustrated) and a driven roller 21 that is rotatable in a driven manner is provided downstream of the line head 40. The medium on which recording has been performed is transported downstream by the second transport roller pair 19.

A third transport roller pair 27 is provided downstream of the second transport roller pair 19, and a discharge roller pair 28 is also provided downstream of the third transport roller pair 27. A portion between the third transport roller pair 27 and the discharge roller pair 28 is configured as a face-down discharge path, and the medium on which recording has been performed is discharged to a discharge tray 29 by the discharge roller pair 28 in a state in which the most recent recording surface faces down.

Next, the cap portion 61 that covers the head chip 43 of the line head 40 will be described with reference to FIG. 2 and subsequent drawings.

Since the head chip 43 is provided in the head surface 42*a*, the cap portion 61 can also be referred to as a member that covers a portion of the head surface 42*a*. Since the head chip 43 is provided with the nozzles 44, the cap portion 61 can also be referred to as a member that covers the nozzles 44. The head chip 43 will be described below.

Figure 2:
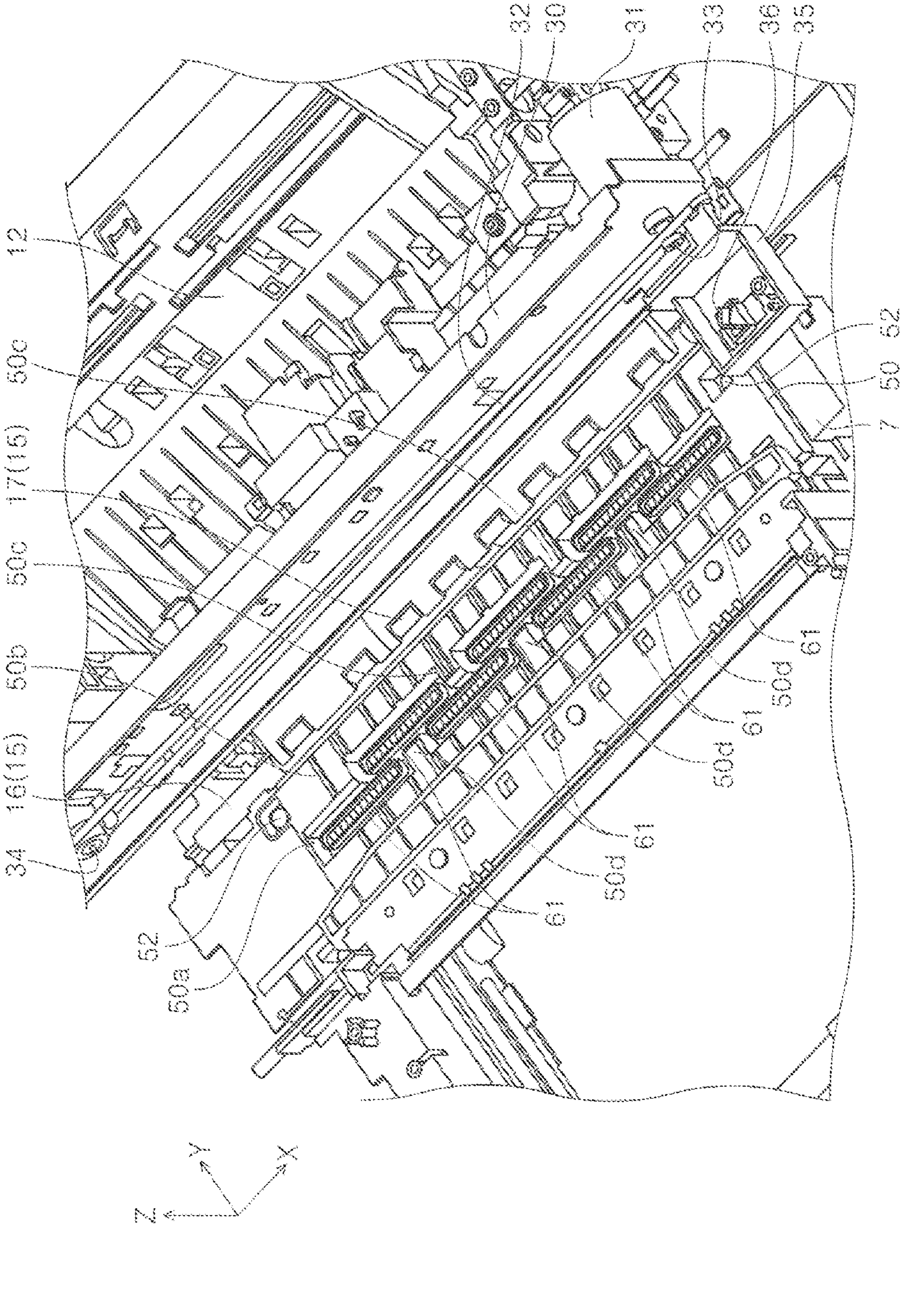
FIG. 2 is a perspective view of a facing portion and a cap portion.

An opening portion 50*a* is formed in the facing portion 50 as illustrated in FIG. 2. A plurality of cap portions 61 are provided on the inner side of the opening portion 50*a*.

Figure 4:
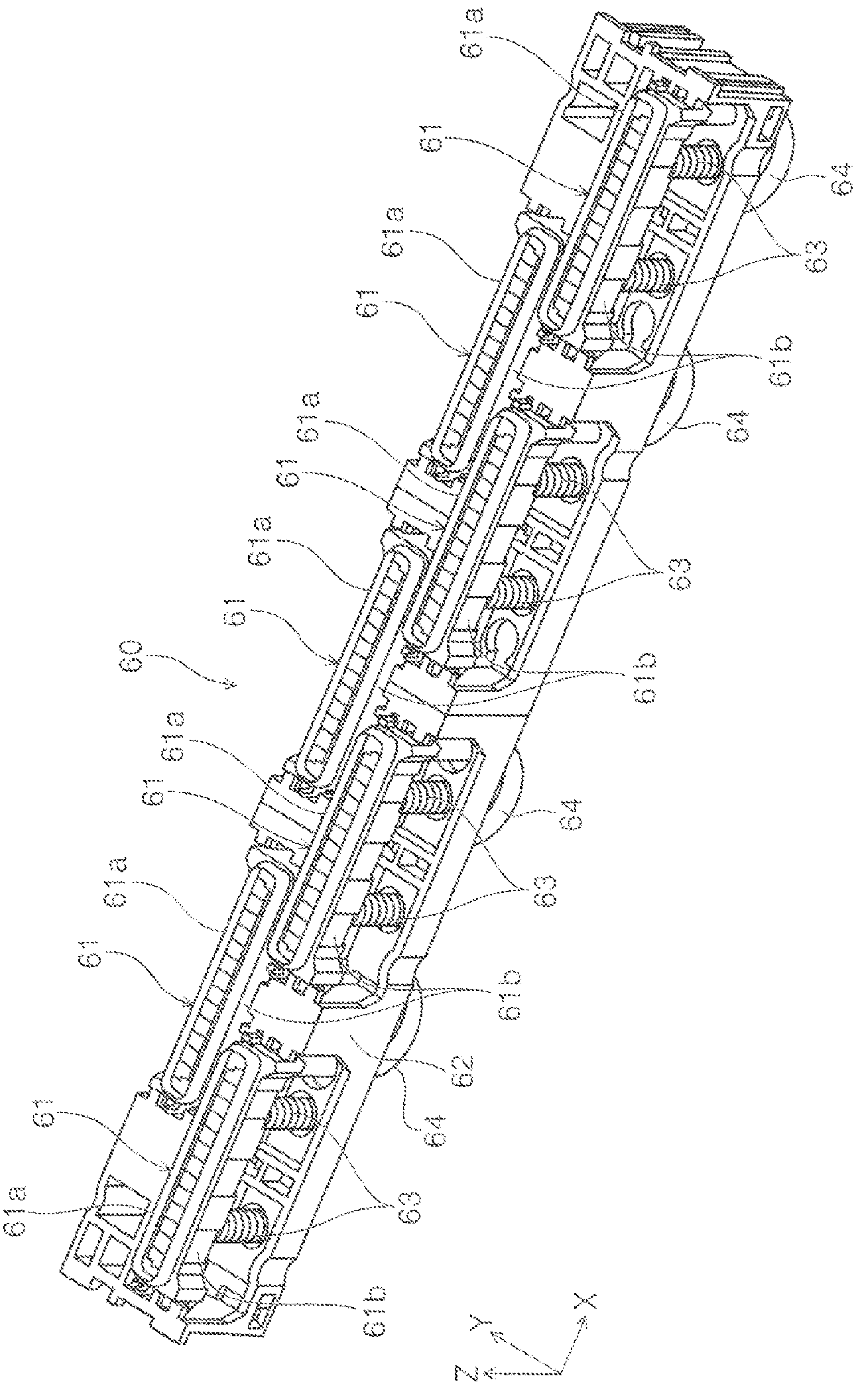
FIG. 4 is a perspective view of a cap unit.

FIG. 4 is a perspective view of a cap unit 60 including the cap portion 61. The cap unit 60 includes a plurality of cap portions 61 in a base portion 62.

The cap portion 61 forms a shape elongated in the X-axis direction, and includes a cap body portion 61*b* formed of a resinous material or the like, and an elastic portion 61*a* formed of an elastic material such as rubber, which is a portion in contact with the head surface 42*a*. The cap body portion 61*b* is held to be displaceable in the Z-axis direction by a guide portion (not illustrated) formed in the base portion 62, and a movement limit in the +Z direction is prescribed by a regulation portion (not illustrated) formed in the base portion 62. The cap body portion 61*b* is pressed in the +Z direction by a cap spring 63 which is an example of a pressing member. In the present embodiment, two cap springs 63 are provided for one cap body portion 61*b*.

A waste liquid tube 64 is coupled to each cap body portion 61*b*. The waste liquid tube 64 is coupled to a pump (not illustrated). When the pump is operated in a state in which the cap portion 61 covers the head surface 42*a*, a negative pressure is generated in the cap portion 61, and thus ink is sucked from the nozzles 44 of the line head 40.

When the line head 40 is moved to the cap position, the cap portion 61 is slightly pressed down in the −Z direction against the pressing force of the cap spring 63, so that the elastic portion 61*a* comes into close contact with the head surface 42*a*.

The cap portions 61 are alternately disposed at an upstream position and a downstream position along the X-axis direction, that is, the medium width direction. In the present embodiment, three cap portions 61 are provided at upstream positions, that is, in the +Y direction, and four cap portions 61 are provided at downstream positions, that is, in the −Y direction.

Such a disposition of the cap portions 61 corresponds to the disposition of the head chips 43 in the line head 40.

Figure 6:
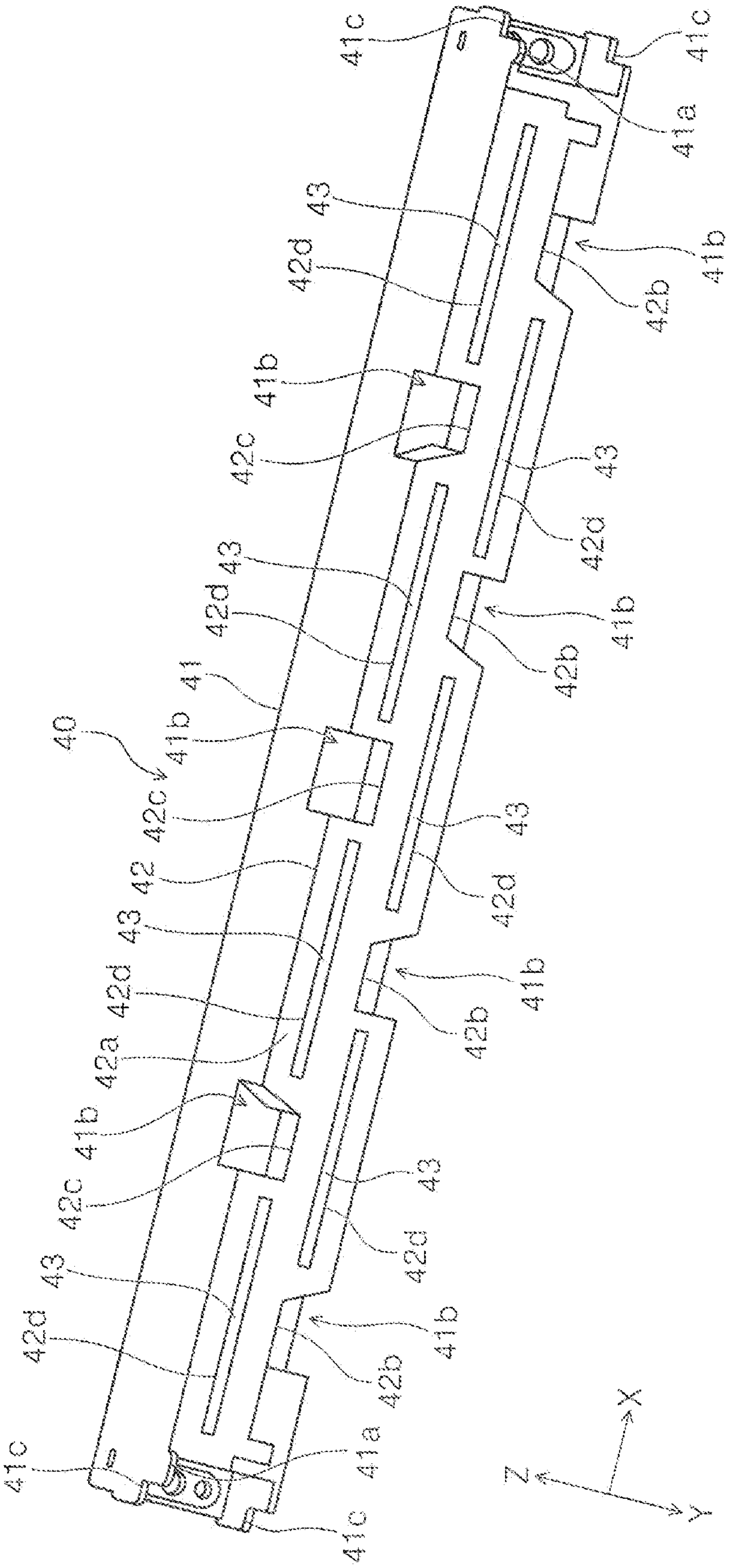
FIG. 6 is a perspective view of the line head.

FIG. 6 illustrates an external configuration of the line head 40, and the line head 40 includes the plate member 42 on a base 41, as illustrated. The base 41 is a structure in which a flow path for supplying ink supplied from the ink storage unit (not illustrated) to the head chip 43 is provided.

The plate member 42 is a metallic plate and forms the head surface 42*a*.

A plurality of opening portions 42*d* are formed in the plate member 42, and the head chip 43 is provided in each opening portion 42*d*. The head chip 43 is provided with the plurality of nozzles 44 (see FIG. 1) along the medium width direction. The plate member 42 and the head chip 43 are provided to be flush with each other.

Further, in the present embodiment, cut-out portions indicated by reference signs 42*b* and 42*c* are formed in a peripheral edge of the plate member 42. The cutout portion indicated by the reference sign 42*b* is referred to as an upstream cutout portion, and the cutout portion indicated by the reference sign 42*c* is referred to as a downstream cutout portion.

Further, concave portions 41*b* are formed in the base 41 at positions corresponding to the cutout portion of the plate member 42. All of the concave portions 41*b* have a shape recessed at least in the +Z direction from the plate member 42.

Further, the first abutting portion 41*a*, which will be described below, is formed at both end portions of the base 41 in the medium width direction to protrude in the −Z direction. Further, two second abutting portions 41*c* are provided at both the end portions of the base 41 in the medium width direction at an interval along the Y-axis direction.

The head chips 43 are alternately disposed at the upstream position and the downstream position along the X-axis direction, that is, the medium width direction. In the present embodiment, three head chips 43 at upstream positions are provided along the medium width direction, and four head chips 43 at downstream positions are provided along the medium width direction. Accordingly, the cap portions 61 covering the head chips 43 are alternately disposed at the upstream position and the downstream position along the medium width direction as described with reference to FIG. 4.

The head chip 43 forms a shape elongated in the medium width direction, and includes a plurality of nozzles 44 (see FIG. 1) along the medium width direction.

Next, the wiper 36 will be described.

As illustrated in FIG. 2, the printer 1 includes a wiper frame 30 extending along the medium width direction. A wiper drive motor 31 is provided at an end portion of the wiper frame 30 along the +X direction. A driving pulley 33 is provided in a motor shaft of the wiper drive motor 31. A driven pulley 34 is provided at an end portion of the wiper frame 30 in the −X direction. An endless belt 32 is wound around the driving pulley 33 and the driven pulley 34. The wiper carriage 35 is fixed to a portion of the endless belt 32, and when the endless belt 32 is rotated by the rotation of the wiper drive motor 31, the wiper carriage 35 moves along the X-axis direction.

In the present embodiment, a home position of the wiper carriage 35 is a position illustrated in FIG. 2, that is, an end portion position in the +X direction. When the apparatus is powered off or in a recording standby state, the wiper carriage 35 is positioned at the home position.

When the wiper carriage 35 moves in the +X direction from the end portion in the −X direction and is located at the home position, the wiper carriage 35 abuts on a movement regulation portion (not illustrated) so that further movement in the +X direction is regulated. The control unit 80 can ascertain that the wiper carriage 35 is located at the home position by detecting an increase in the motor driving current value when the wiper carriage 35 abuts on the movement regulation portion.

In addition, the wiper drive motor 31 is provided with an encoder sensor (not illustrated), and the control unit 80 can detect an amount of rotation of the wiper drive motor 31. This makes it possible for the control unit 80 to detect an amount of movement of the wiper carriage 35 from the home position, that is, to ascertain a current position of the wiper carriage 35.

The wiper carriage 35 is provided with the wiper 36. The wiper 36 is made of an elastic material such as rubber, and wipes particularly the head chip 43 on the head surface 42*a* by the wiper carriage 35 moving in the medium width direction in a state in which the wiper 36 is in elastic contact with the head surface 42*a*. The ink removed by wiping is stored in the wiper carriage 35.

The wiper carriage 35 may be formed in a box shape of which an upper portion is open, or may be formed in a semi-closed shape in which only a portion corresponding to the wiper 36 is open.

Figure 12:
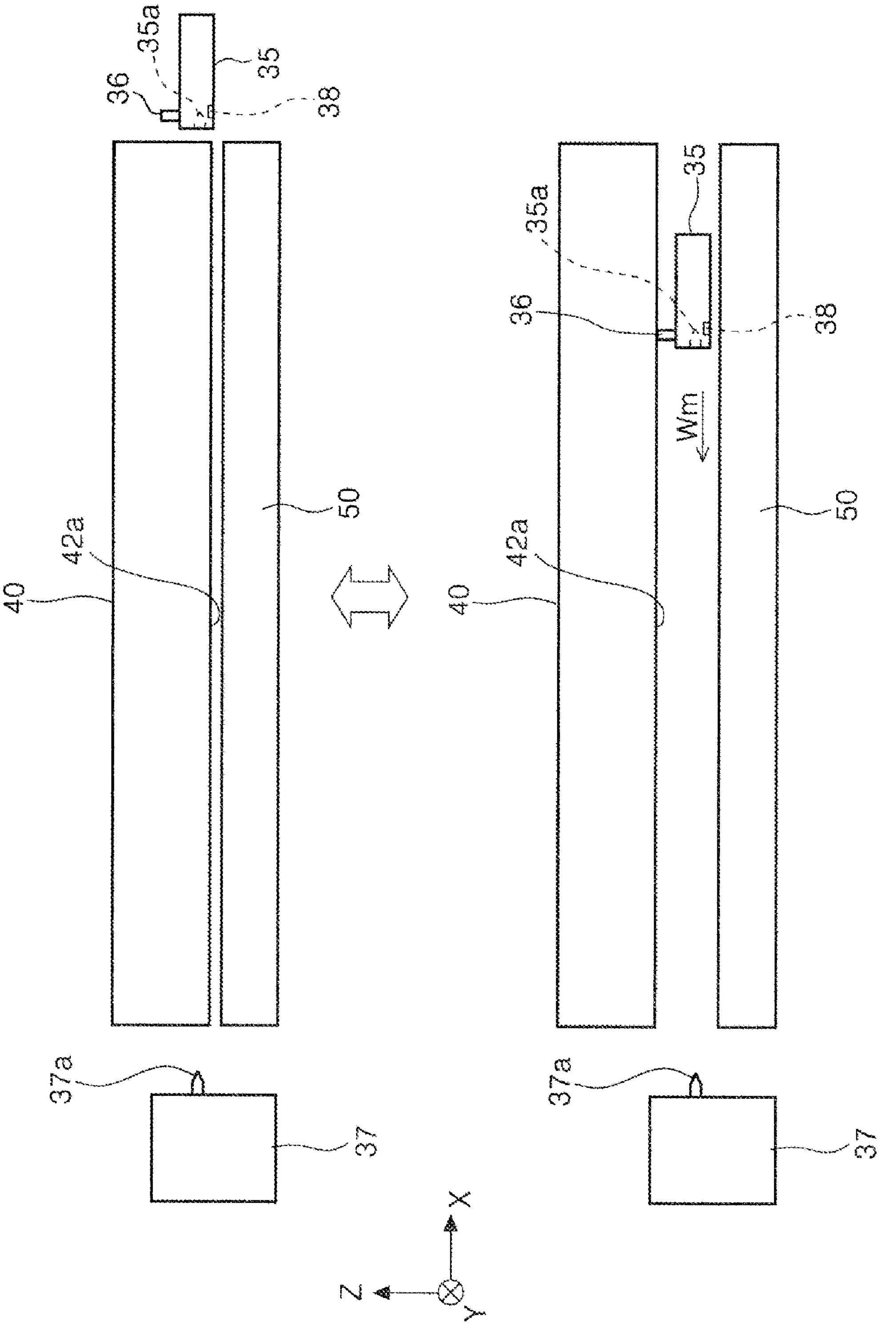
FIG. 12 is an operation transition diagram when the line head moves between the recording position and a wiping position.

As illustrated in FIG. 12, a fitting hole 35*a* is provided at an end portion of the wiper carriage 35 in the −X direction. A check valve (not illustrated) is provided in the fitting hole 35*a* and configured so that ink stored in the wiper carriage 35 does not leak out by the check valve.

An ink recovery portion 37 is provided at an end portion in the −X direction in a movement region of the wiper carriage 35. The ink recovery portion 37 includes a suction portion 37*a*, and the suction portion 37*a* can be fitted to the fitting hole 35*a* of the wiper carriage 35. When the wiper carriage 35 moves to the end portion in the −X direction, the suction portion 37*a* is fitted into the fitting hole 35*a*. When the suction portion 37*a* is fitted into the fitting hole 35*a*, the check valve is open. In this state, a pump (not illustrated) provided in the ink recovery portion 37 is driven so that the ink stored in the wiper carriage 35 is sucked. The ink suction by the ink recovery portion 37 is performed, for example, when the apparatus is powered off or when the number of times the head surface 42*a* is wiped by the wiper 36 reaches a predetermined number of times.

The ink recovery portion 37 may be provided at the end portion in the +X direction, that is, on the home position side of the wiper carriage 35, instead of being provided at the end portion in the −X direction. In this case, the suction portion 37*a* may be configured to be fitted into the fitting hole 35*a* when the wiper carriage 35 is located at the home position.

Next, the facing portion 50 will be described.

As illustrated in FIGS. 2, 3, 7, and 8, a plurality of support ribs 50*b* extending in the Y-axis direction, that is, the medium transport direction are formed in the facing portion 50 at appropriate intervals along the medium width direction.

The opening portion 50*a* is formed in the facing portion 50, and the cap portion 61 is disposed on the inner side of the opening portion 50*a*.

The opening portions 50*a* are formed alternately at an upstream position and a downstream position along the medium width direction to correspond to the disposition of the plurality of head chips 43, in other words, to correspond to the disposition of the plurality of cap portions 61.

Since the opening portion 50*a* is formed in this manner, support portions indicated by reference signs 50*c* and 50*d* are formed between two adjacent cap portions 61 in the medium width direction in the facing portion 50. Hereinafter, the support portion indicated by reference sign 50*c* is referred to as a first support portion 50*c*, and the support portion indicated by reference sign 50*d* is referred to as a second support portion 50*d*.

The first support portion 50*c* extends from an upstream end of the opening portion 50*a* to the downstream, and a chamfered portion 50*e* is formed at a corner portion at a downstream end thereof. In addition, the second support portion 50*d* extends upstream of a downstream end of the opening portion 50*a*, and a chamfered portion 50*f* is formed at a corner portion at an upstream end thereof.

With the chamfered portion 50*f*, it is possible to curb the leading end of the medium being caught by the second support portion 50*d* when the medium is transported from the upstream toward the downstream. In addition, with the chamfered portion 50*e*, it is possible to curb the leading end of the medium being caught by the first support portion 50*c* when the medium is transported from the downstream toward the upstream.

The chamfered portions 50*e* and 50*f* may be formed in an R shape instead of a chamfered shape.

Figure 11:
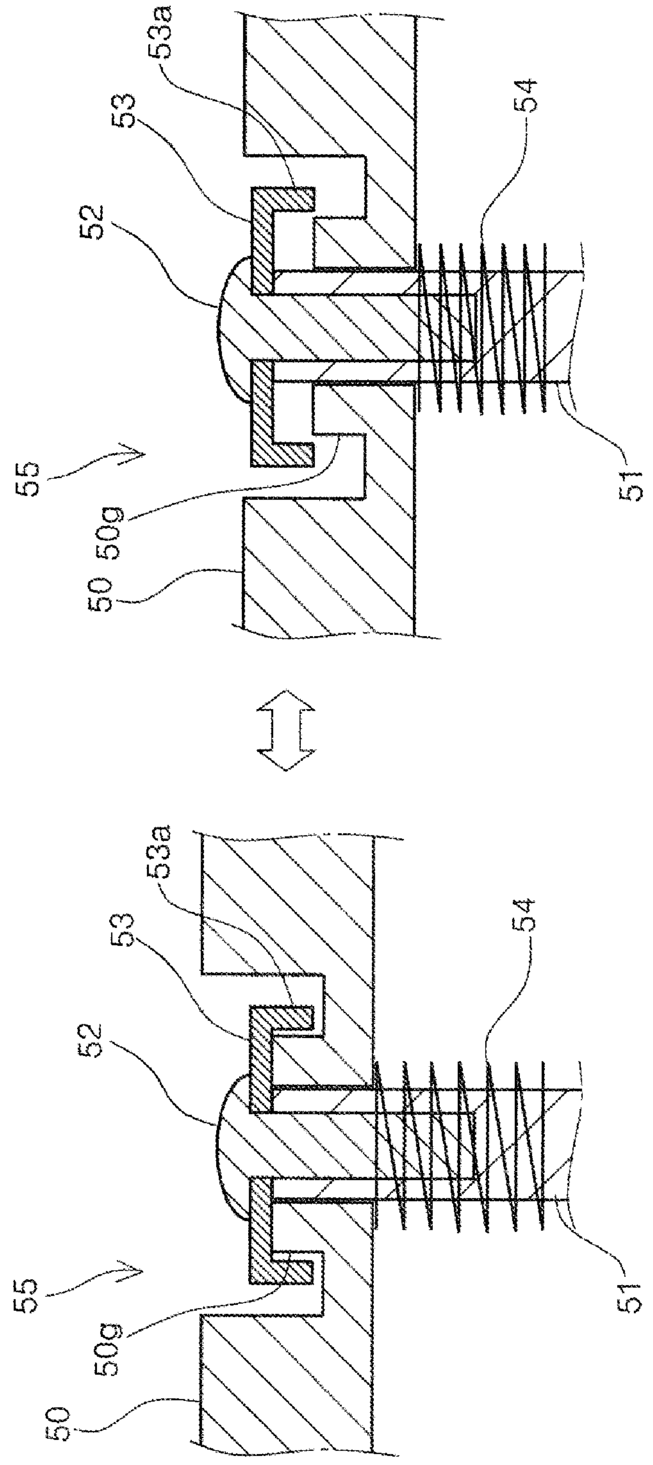
FIG. 11 is a cross-sectional view of a support structure that supports the facing portion.

Next, the facing portion 50 is supported by the main frame 7 constituting the base of the printer 1 at both end portions in the medium width direction. FIG. 11 illustrates a support structure 55 that supports the facing portion 50. The support structure 55 includes a guide shaft 51, a cylindrical portion 50*g*, a stopper 53, a screw 52, and a pressing spring 54.

More specifically, the guide shaft 51 is provided in the main frame 7. The cylindrical portion 50*g* is formed in the facing portion 50, and the guide shaft 51 enters the cylindrical portion 50*g*. Accordingly, the cylindrical portion 50*g*, that is, the facing portion 50 is provided to be displaceable in the Z-axis direction.

The guide shaft 51 is provided with a pressing spring 54 which is an example of a pressing member, and the facing portion 50 is pressed in the +Z direction by the pressing spring 54.

An upper end portion of the guide shaft 51 is configured as a screw hole into which the screw 52 can be fitted. The stopper 53 enters between the screw 52 and the upper end portion of the guide shaft 51, and the stopper 53 is fixed to the guide shaft 51 by the screw 52. The stopper 53 prescribes a movement limit of the cylindrical portion 50*g*, that is, the facing portion 50 in the +Z direction. That is, the stopper 53 is a movement prescribing portion that prescribes the movement limit of the facing portion 50 in a direction to the line head 40, which is a portion on which an upper end of the cylindrical portion 50*g* abuts.

Although not illustrated in the drawings, the stopper 53 has a disk-like shape when viewed from the Z-axis direction, and a covering portion 53*a* is formed to hang downward from an outer peripheral portion.

An upper end portion of the cylindrical portion 50*g* is covered by the covering portion 53*a*.

A left drawing of FIG. 11 illustrates a state in which the line head 40 is spaced apart from the facing portion 50, and a right drawing of FIG. 11 illustrates a state in which the line head 40 presses down the facing portion 50.

Figure 3:
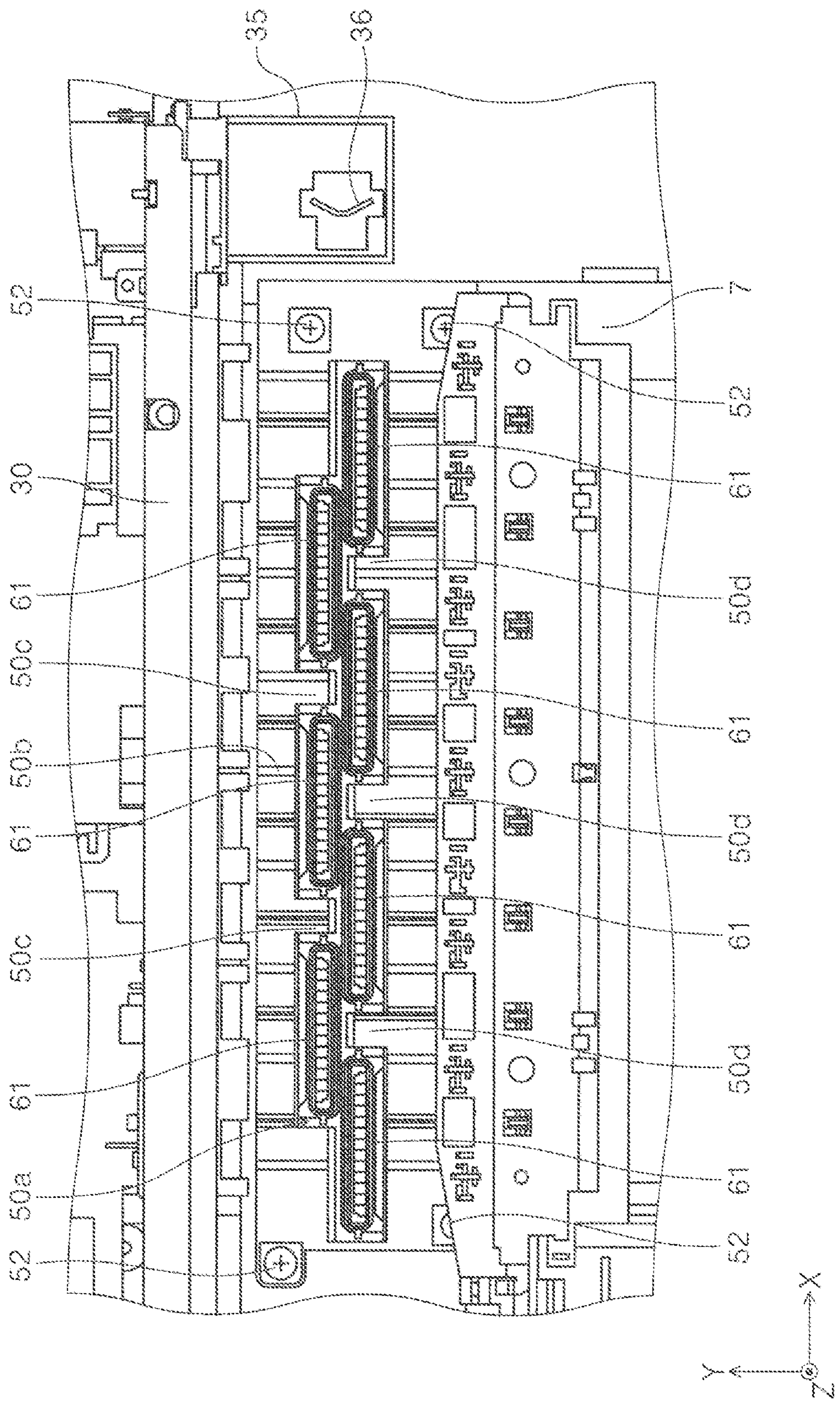
FIG. 3 is a plan view of the facing portion and the cap portion.
Figure 7:
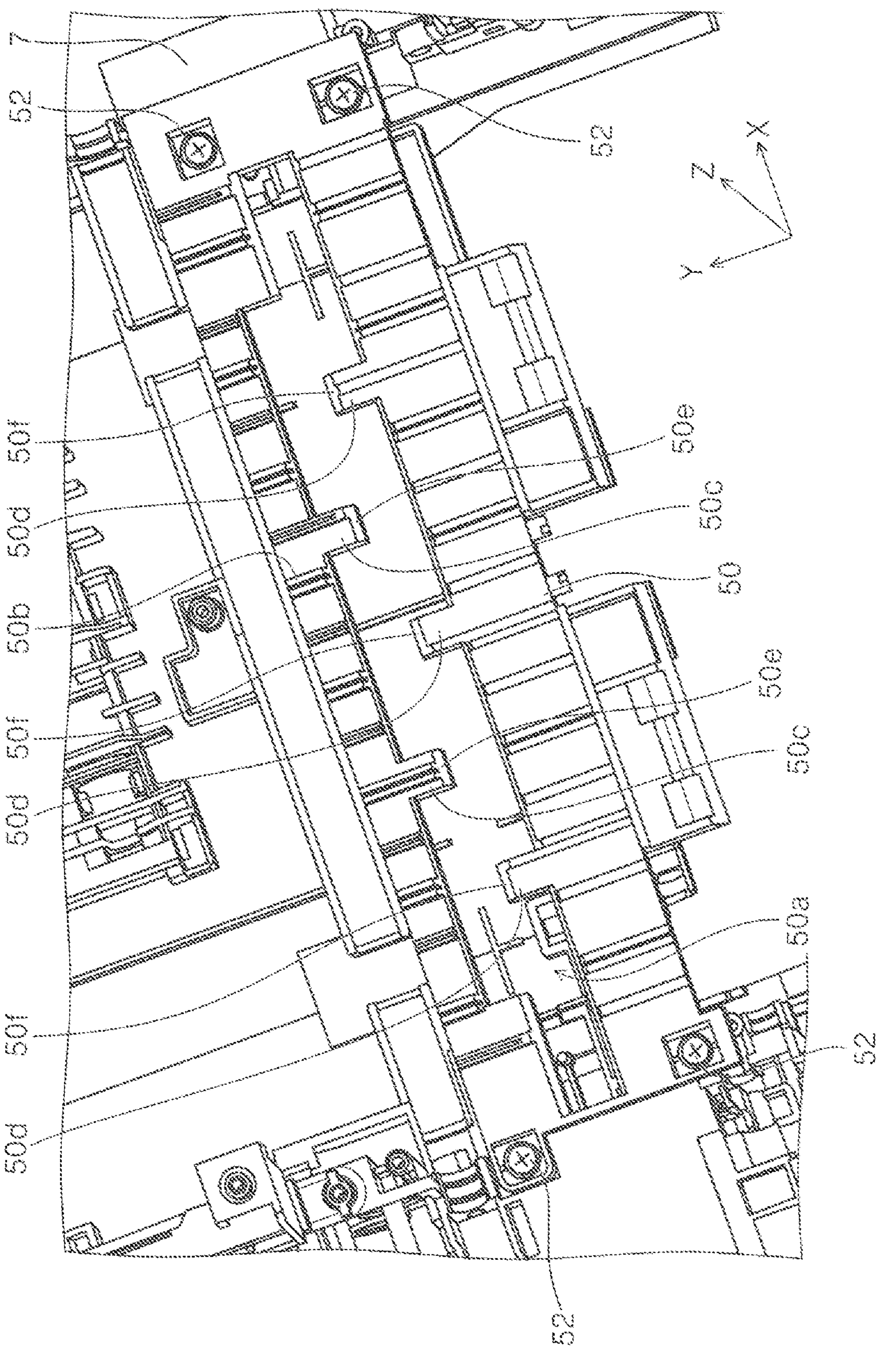
FIG. 7 is a perspective view of the facing portion.
Figure 8:
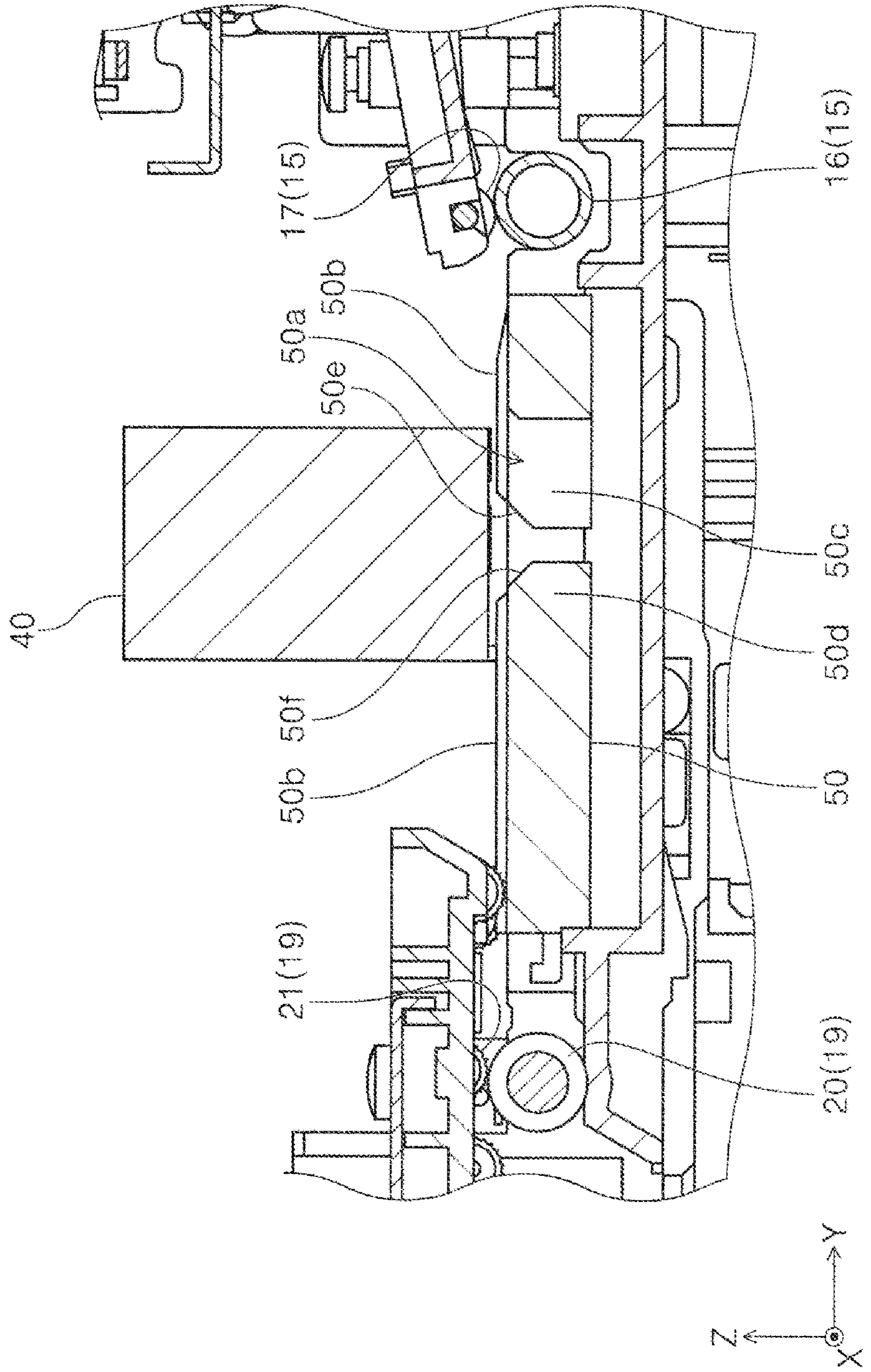
FIG. 8 is a side cross-sectional view of the line head and the facing portion.

As illustrated in FIGS. 3 and 7, the support structures 55 described above are provided at both end portions of the facing portion 50 in the medium width direction, and are provided with an interval in the Y-axis direction at both the end portions of the facing portion 50.

The two support structures 55 located at the end portion in the +X direction in the medium width direction are located at the same position in the X-axis direction, and the two support structures 55 located at the end portion in the −X direction are located at slightly different positions in the X-axis direction. However, the positions in the X-axis direction of the two support structures 55 located at the end portion in the −X direction may be the same.

In addition, although four support structures 55 are provided in the present embodiment, the present disclosure is not limited thereto, and a plurality of support structures 55 may be provided. Here, it is possible to stably support the facing portion 50 by providing three support structures 55. When the three support structures 55 are provided, for example, it is preferable to provide two of the support structures 55 at one end portion in the medium width direction and one of the support structures 55 at the other end portion. Further, in this case, it is preferable that the one support structure 55 is provided between the two support structures 55 in the Y-axis direction, particularly, at an intermediate position.

Figure 10:
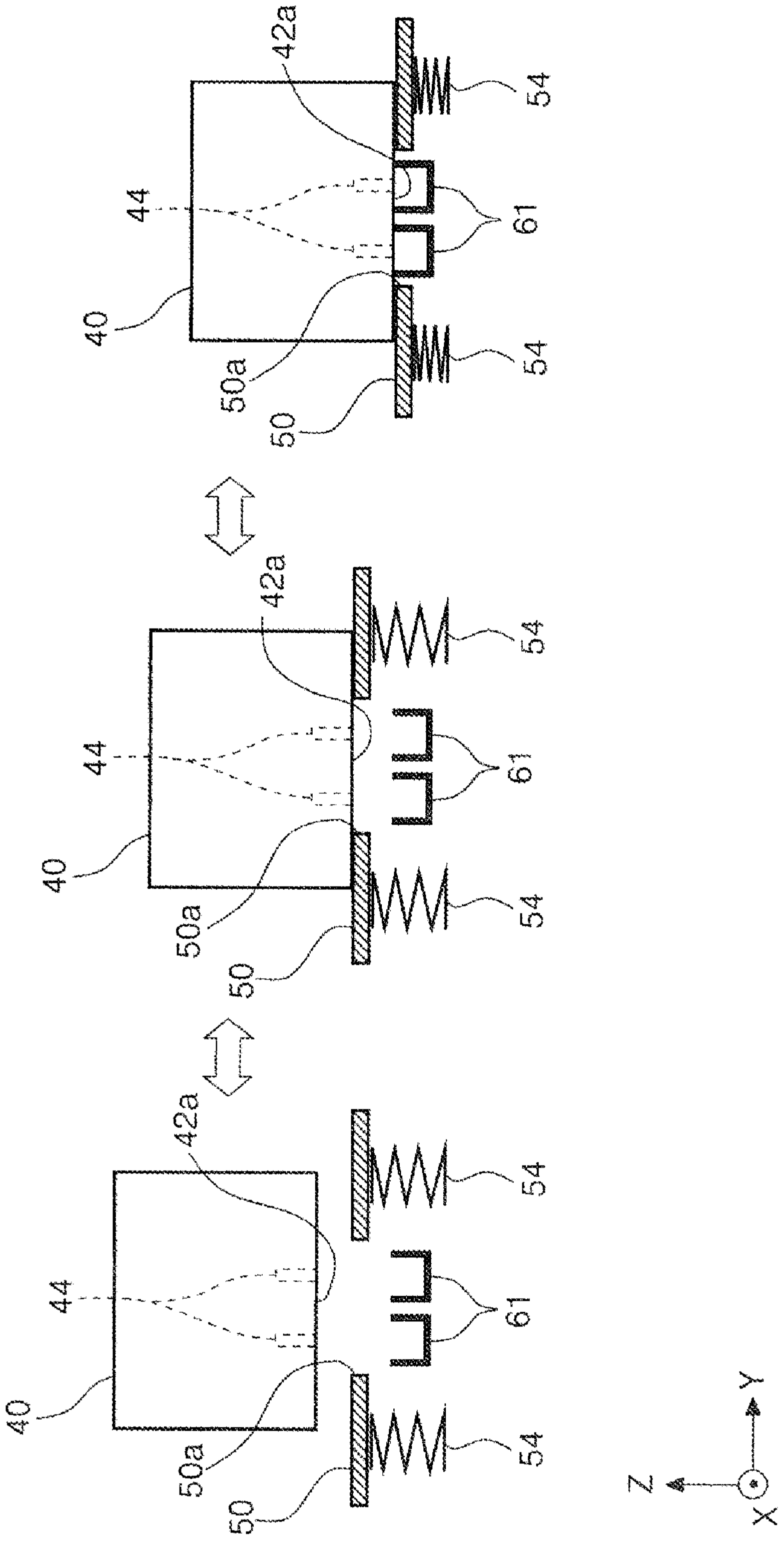
FIG. 10 is an operation transition diagram when the line head moves between a recording position and a cap position.

Next, FIG. 10 illustrates state change when the line head 40 moves from the recording position to the cap position. FIG. 10 schematically illustrates each configuration.

A leftmost diagram in FIG. 10 illustrates a state in which the line head 40 is at the recording position. When the line head 40 is lowered from this state to move to the cap position, a portion of the line head 40 abuts on the facing portion 50 as illustrated in a center of FIG. 10.

When the line head 40 is further lowered, the line head 40 presses down the facing portion 50 against a pressing force of the pressing spring 54. When the line head 40 moves to the cap position as illustrated in a rightmost drawing of FIG. 10, the cap portion 61 abuts on the head surface 42*a* and covers the nozzles 44.

At power-off or in a recording standby state, the line head 40 is positioned at the cap position.

In FIG. 6, reference sign 41*a* indicates a first abutting portion that is a portion in which the line head 40 abuts on the facing portion 50. In the present embodiment, the first abutting portions 41*a* are provided at both end portions of the line head 40 in the medium width direction.

Figure 9:
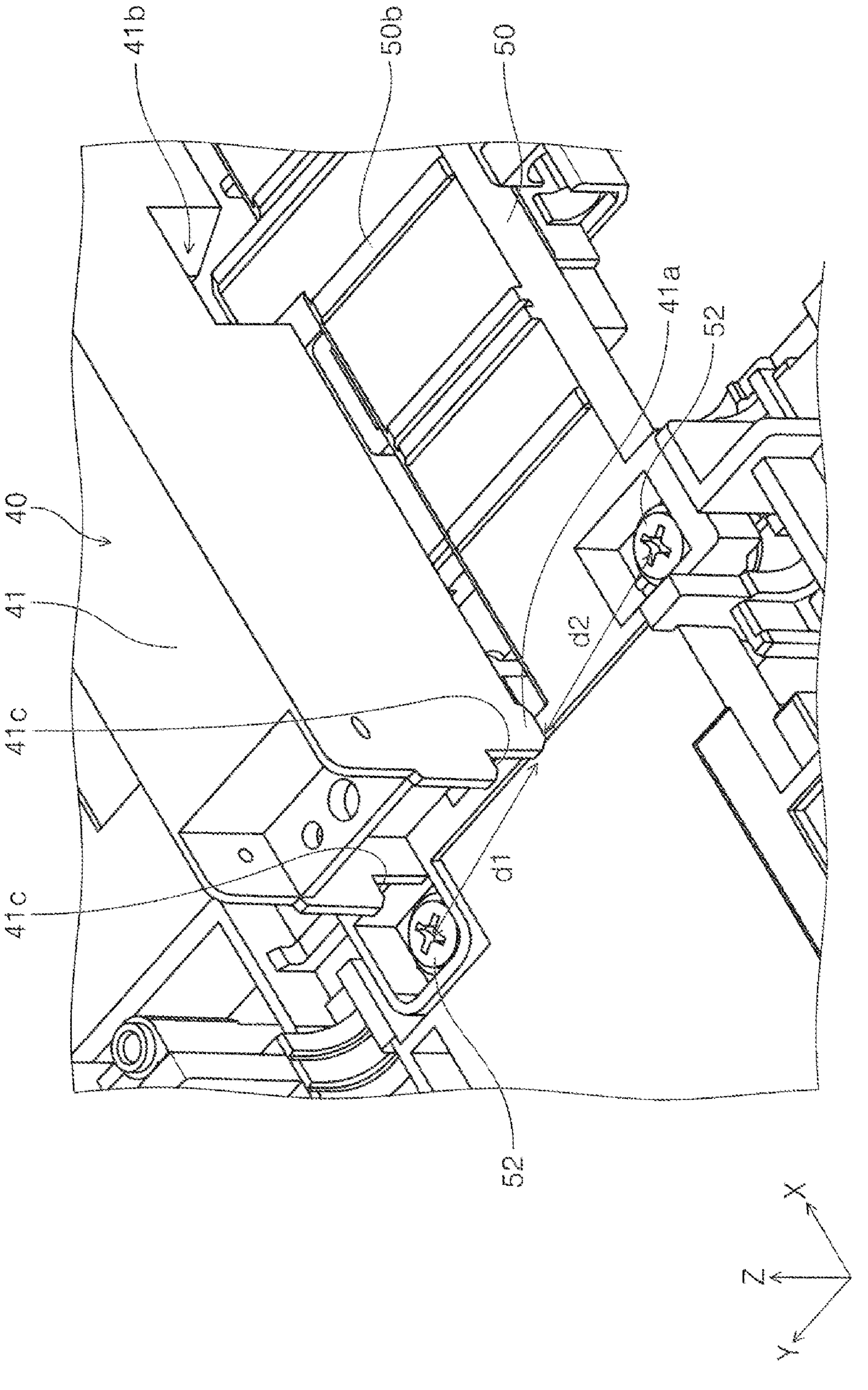
FIG. 9 is a perspective view illustrating a portion in which the line head abuts on the facing portion.

FIG. 9 illustrates a state in which the first abutting portion 41*a* provided at the end portion in the −X direction abuts on the facing portion 50. As illustrated in the drawing, the first abutting portion 41*a* abuts on the facing portion 50 between the two support structures 55 provided with an interval in the Y-axis direction. Accordingly, a distance between the first abutting portion 41*a* and the support structure 55 does not become too long, and the cylindrical portion 50*g* can smoothly move with respect to the guide shaft 51 illustrated in FIG. 11.

Further, in FIG. 9, reference sign d1 denotes a distance from the support structure 55 located on the upstream to the facing portion 50, and reference sign d2 denotes a distance from the support structure 55 located on the downstream to the facing portion 50. In the present embodiment, the two distances d1 and d2 are equal to each other, that is, the first abutting portion 41*a* is configured to abut on the facing portion 50 at an intermediate position between the two support structures 55. Although not illustrated, the same applies to the two support structures 55 and the first abutting portion 41*a* located at an end portion in the +X direction. However, the present disclosure is not limited thereto, and the distance d1 and the distance d2 may be different from each other.

In addition, a plurality of first abutting portions 41*a*, for example, two first abutting portions 41*a* may be provided between the two support structures 55 provided with an interval in the Y-axis direction. In this case, it is preferable that the two first abutting portions 41*a* are disposed at positions symmetrical with respect to the intermediate position between the two support structures 55 provided with an interval in the Y-axis direction.

Next, FIG. 12 illustrates a movement of the line head 40 when the wiper 36 wipes the head surface 42*a*.

An upper diagram of FIG. 12 illustrates a state in which the line head 40 is at the recording position. When the head surface 42*a* is wiped by the wiper 36 from this state, the line head 40 moves upward to the wiping position as shown by the change from an upper drawing to a lower drawing in FIG. 12. Accordingly, a gap is formed so that the wiper carriage 35 enters between the line head 40 and the facing portion 50, and the wiper 36 can abut on the head surface 42*a*.

In this state, the wiper carriage 35 is moved as indicated by an arrow Wm so that the wiper 36 wipes the head surface 42*a*.

When the wiper 36 moves to the end portion in the −X direction, that is, when the wiper 36 wipes the head surface 42*a*, the wiper carriage 35 moves in the +X direction to return to the home position at the end portion in the +X direction. Prior to this operation, the line head 40 may be slightly moved upward so that the wiper 36 does not contact the head surface 42*a*.

As described above, the line head 40 is movable in the direction in which the line head 40 moves forward and backward with respect to the facing portion 50 by the power of the head movement motor 81, and the movement region of the line head 40 includes the recording position at which recording is performed on the medium, and the cap position at which the head surface 42*a* is covered by the cap portion 61.

This eliminates the need for a drive source for driving the cap portion 61, thereby curbing an increase in the size and cost of the apparatus.

The line head 40 includes the first abutting portion 41*a* abutting on the facing portion 50, the facing portion 50 is displaceable along the movement direction of the line head 40 and pressed toward the line head 40 by the pressing spring 54, and the line head 40 abuts on the facing portion 50 in a process in which the line head 40 moves from the recording position to the cap position, and moves the facing portion 50 against the pressing force of the pressing spring 54.

Here, when the facing portion 50 is used as a support means for supporting the medium, and the opening portion 50*a* formed in the facing portion 50 is large, there is concern that the medium may enter the opening portion 50*a*, and therefore, it is preferable to make the opening portion 50*a* as small as possible. However, when the opening portion 50*a* is made small, the facing portion 50 interferes with the line head 40 when the cap portion 61 covers the head surface 42*a*, and there is a problem in that the cap portion 61 cannot cover the head surface 42*a*.

Therefore, in the present aspect, the facing portion 50 is made displaceable along the movement direction of the line head 40, and is pressed toward the line head 40 by the pressing spring 54. The line head 40 is configured to abut on the facing portion 50 in a process in which line head 40 moves from the recording position to the cap position, and move the facing portion 50 against the pressing force of the pressing spring 54. Accordingly, when the cap portion 61 covers the head surface 42*a*, the facing portion 50 does not become an obstacle, the opening portion 50*a* can be made small, and when the facing portion 50 is used as a support means, entrance of the medium into the opening portion 50*a* can be curbed.

In addition, the line head 40 includes a plurality of head chips 43 having nozzles 44 that eject ink, and the head chips 43 are alternately disposed at an upstream position and a downstream position along the medium width direction that is a direction intersecting the medium transport direction. The opening portions 50*a* are formed alternately at upstream positions and downstream positions along the medium width direction to correspond to the disposition of the plurality of head chips 43. The facing portion 50 includes a first support portion 50*c* and a second support portion 50*d*, which are support portions that support the medium, between two head chips 43 adjacent in the medium width direction. This makes it possible to appropriately support the medium and to curb entrance of the medium into the opening portion 50*a*.

In the present embodiment, the first support portion 50*c* and the second support portion 50*d* do not overlap each other in the medium transport direction, but may be configured to overlap each other. With this configuration, it is possible to suitably curb entrance of medium into the opening portion 50*a*.

The support portion provided between the two head chips 43 adjacent in the medium width direction includes a first support portion 50*c* extending from upstream to downstream in the medium transport direction and a second support portion 50*d* extending from downstream to upstream in the medium transport direction. This makes it possible to more appropriately support the medium, and thus to further curb entrance of the medium into the opening portion 50*a*.

Further, the corner portion at the downstream end of the first support portion 50*c* in the medium transport direction is formed as the chamfered portion 50*e*, and the corner portion at the upstream end of the second support portion 50*d* in the medium transport direction is formed as the chamfered portion 50*f*. This makes it possible to curb the leading end of the medium being caught by the second support portion 50*d* when the medium is transported from upstream to downstream in the medium transport direction, and it is possible to curb the leading end of the medium being caught by the first support portion 50*c* when the medium is transported from downstream to upstream in the medium transport direction.

Further, the printer 1 includes the guide shaft 51 that guides the facing portion 50 in the movement direction, which is a shaft extending in the movement direction of the line head 40, the cylindrical portion 50*g* which is provided in the facing portion 50 and is guided by the guide shaft 51 by the guide shaft 51 being inserted into the cylindrical portion 50*g*, and the stopper 53 which is a portion on which the upper end of the cylindrical portion 50*g* abuts and which is a movement prescribing portion which prescribes the movement limit of the facing portion 50 in the direction to the line head 40. The pressing spring 54 is configured to press the cylindrical portion 50*g* toward the stopper 53.

With this configuration, the cylindrical portion 50*g* is sandwiched between the pressing spring 54 and the stopper 53. As a result, it is possible to curb bending of the facing portion 50 caused by the pressing force of the pressing spring 54.

Further, the stopper 53 includes the covering portion 53*a* that covers the periphery of the upper end of the cylindrical portion 50*g*. Accordingly, the following operational effects are obtained.

That is, when foreign matter enters between the upper end of the cylindrical portion 50*g* and the stopper 53, this distorts the platen gap which is a gap between the line head 40 and the facing portion 50, and there is concern that recording quality is adversely affected. However, since the stopper 53 includes the covering portion that covers the periphery of the upper end of the cylindrical portion 50*g*, it is possible to curb entrance of foreign matter between the upper end of the cylindrical portion 50*g* and the stopper 53, and thus to appropriately maintain the platen gap.

Further, the facing portion 50 extends along the medium width direction that is the direction intersecting the medium transport direction, and the cylindrical portions 50*g* are provided at two locations with an interval therebetween in the medium transport direction at both end portions of the facing portion 50 in the medium width direction. The line head 40 abuts on the facing portion 50 between the cylindrical portions 50*g* provided at two locations with an interval therebetween in the medium transport direction. This makes it possible to curb the facing portion 50 being bent along the medium width direction when the line head 40 presses down the facing portion 50.

The facing portion 50 described above is provided to be displaceable in a direction in which the facing portion 50 moves forward and backward with respect to the line head 40, but the present disclosure is not limited thereto, and the facing portion 50 may be provided in a fixed manner. Further, in this case, the line head 40 may be lowered with respect to the cap portion 61 provided on the inner side of the opening portion 50*a* of the facing portion 50 so that the head surface 42*a* is covered with the cap portion 61.

Next, a configuration when a driven roller 71 is provided between the first transport roller pair 15 and the second transport roller pair 19 will be described. The driven roller 71 may be provided between the first transport roller pair 15 and the second transport roller pair 19.

Figure 13:
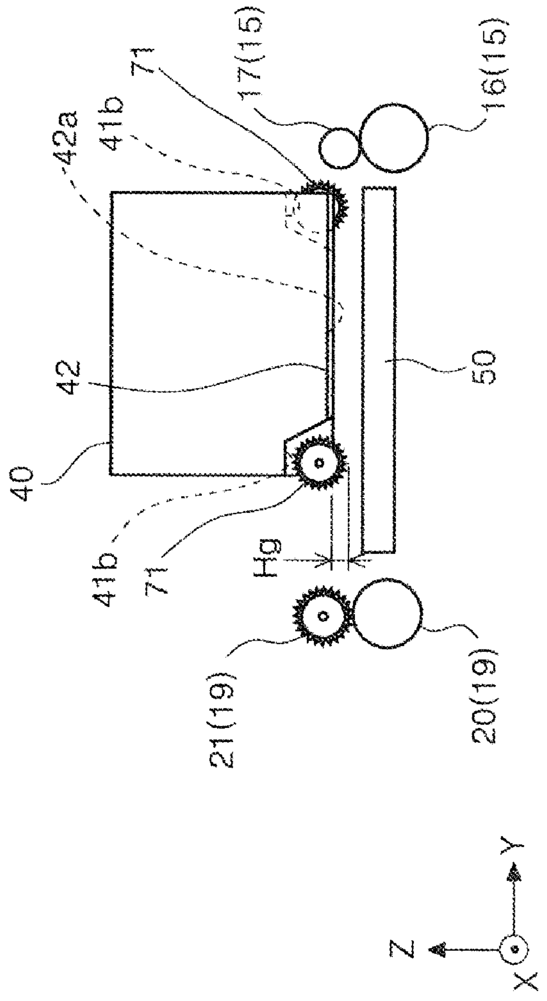
FIG. 13 is a view illustrating a portion of a medium transport path of a printer.

As illustrated in FIG. 13, The driven roller 71 is provided between the first transport roller pair 15 and the second transport roller pair 19 in the medium transport direction. In the present embodiment, the driven roller 71 is a toothed roller having teeth along an outer periphery thereof.

The driven roller 71 is disposed at a position overlapping the line head 40 in the medium transport direction. In the present embodiment, the driven roller 71 is provided at an upstream position and a downstream position in the medium transport direction.

Figure 14:
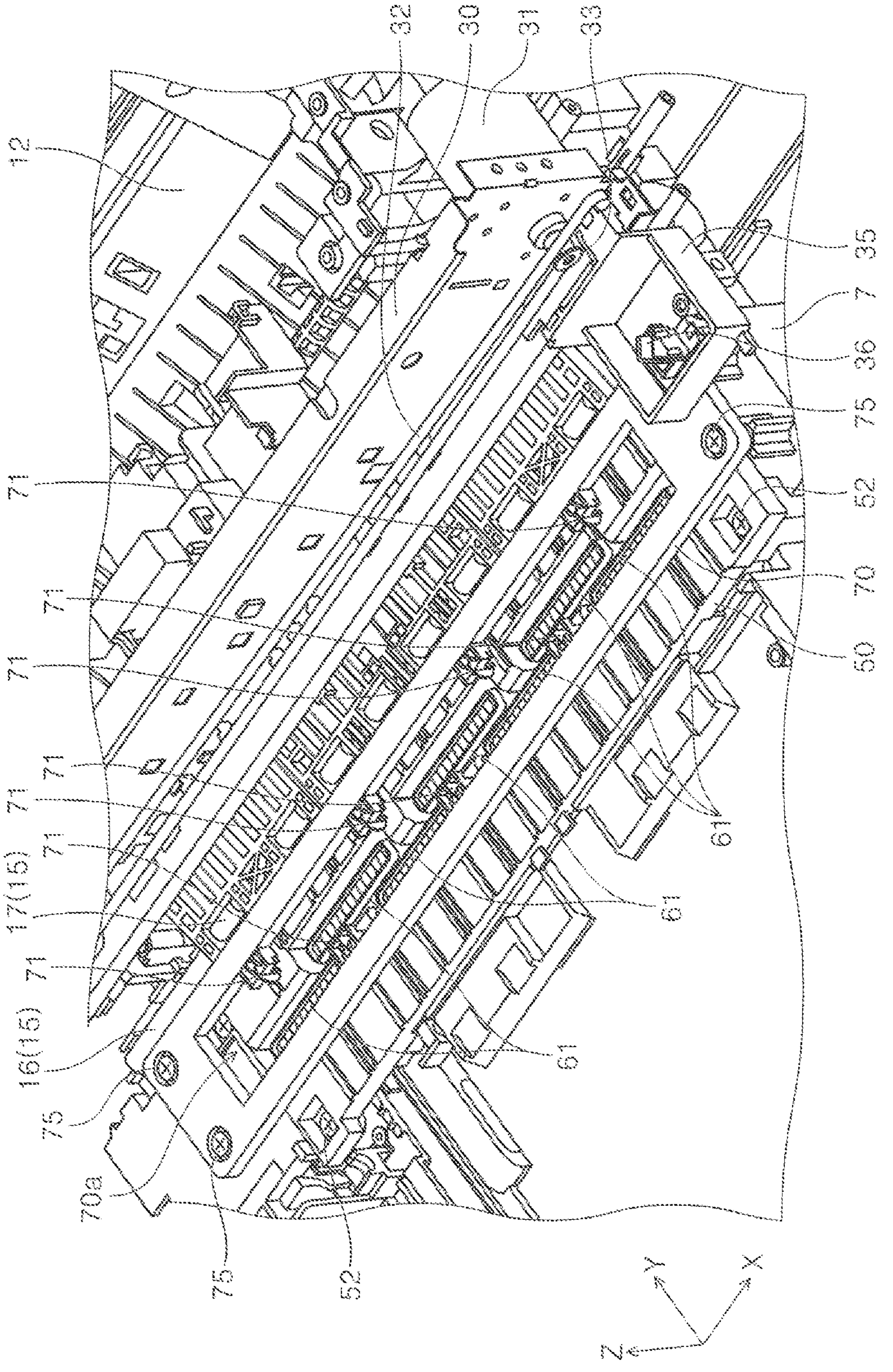
FIG. 14 is a perspective view of the facing portion, the cap portion, and a roller support frame.
Figure 15:
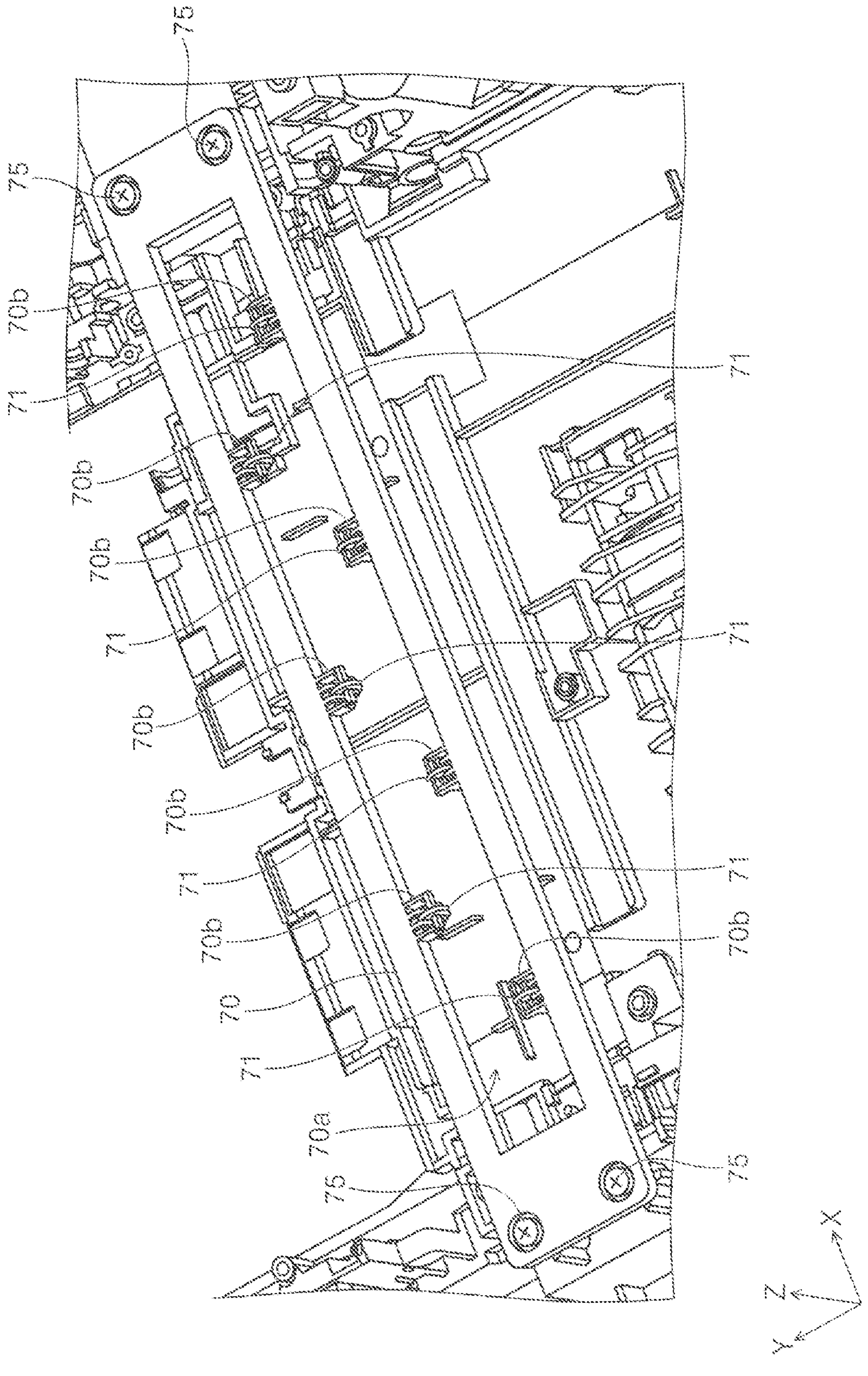
FIG. 15 is a perspective view of the roller support frame.
Figure 16:
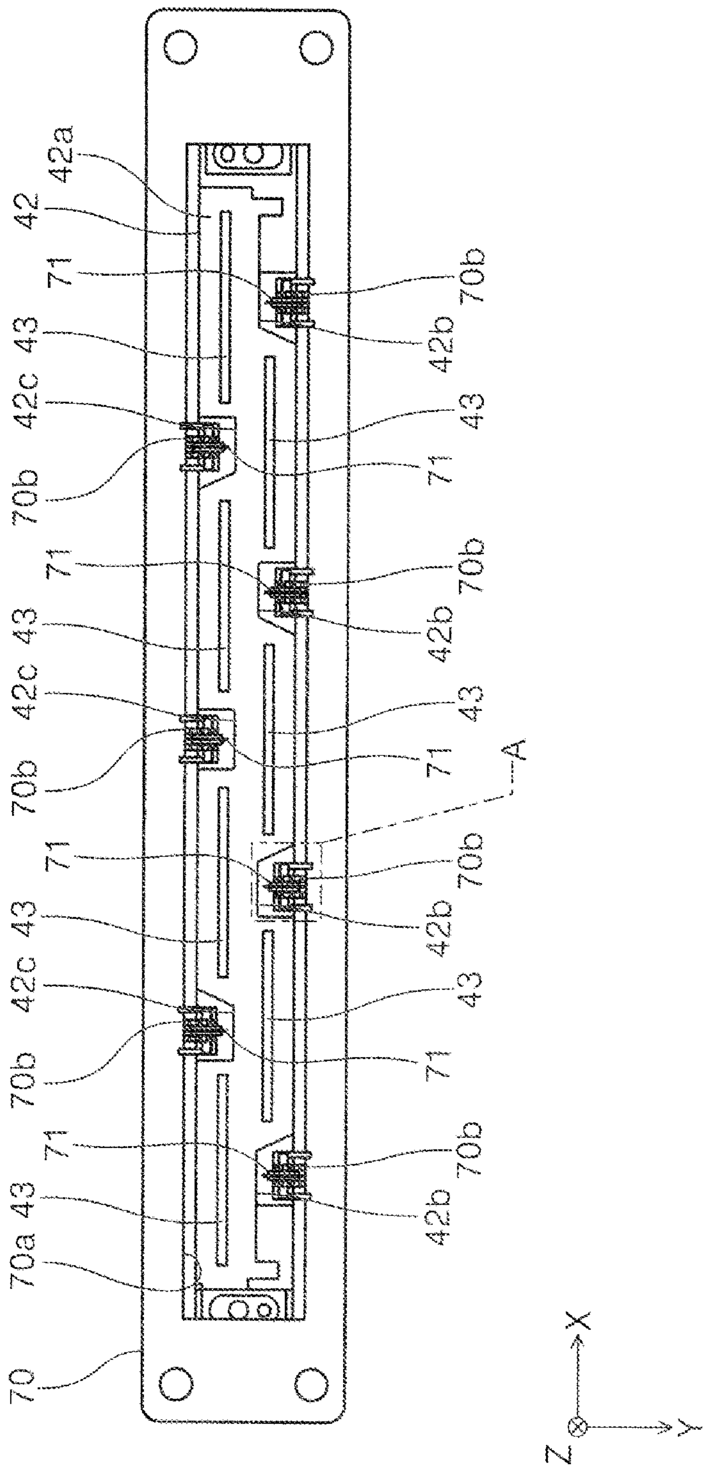
FIG. 16 is a plan view of the roller support frame and a head surface.

The driven roller 71 is supported by a roller support frame 70, as illustrated in FIGS. 14, 15, and 16. The roller support frame 70 is formed in a frame shape to have an opening portion 70*a*, and supports the driven roller 71 inside the opening portion 70*a*.

Figure 17:
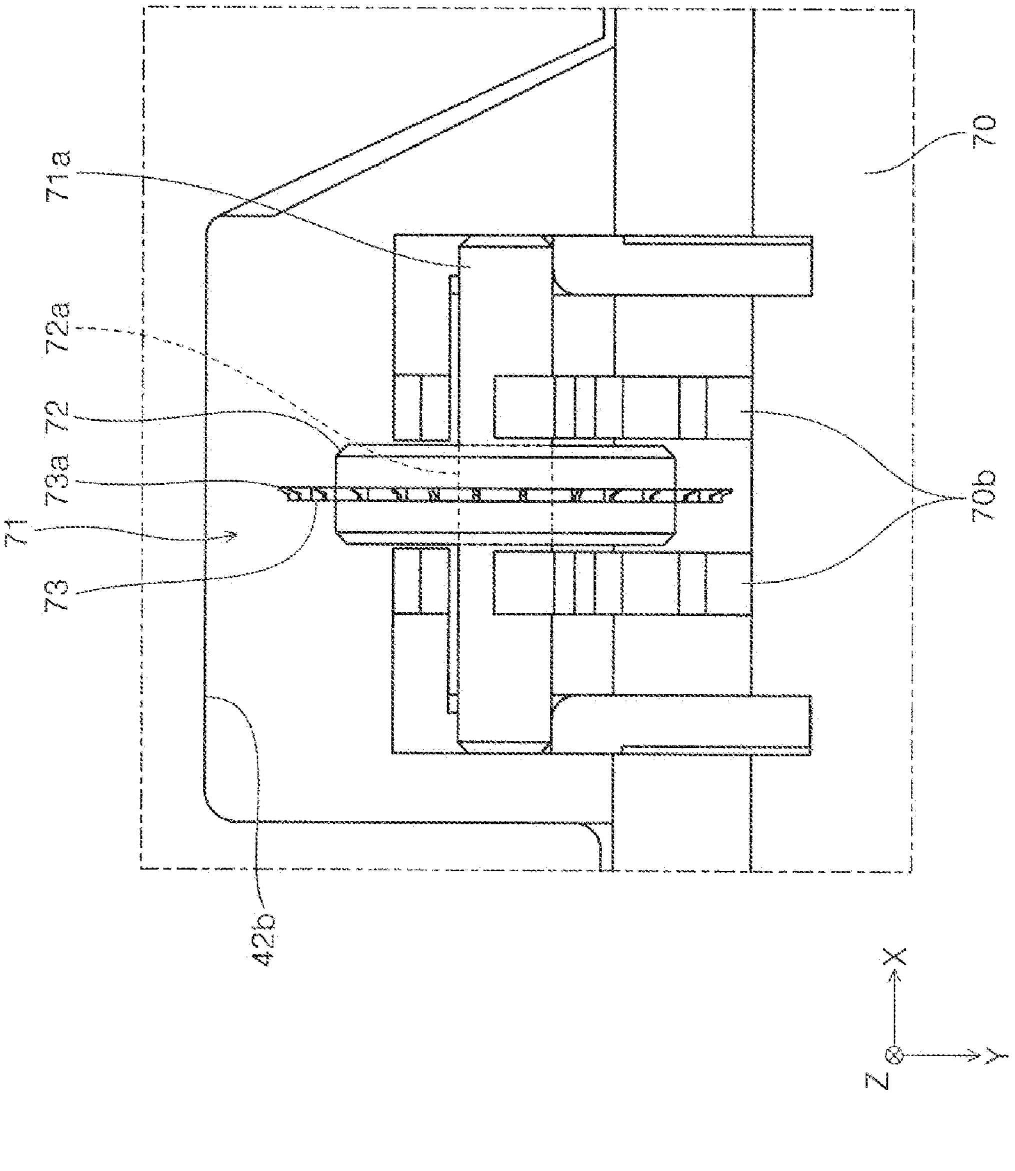
FIG. 17 is an enlarged view of a portion A in FIG. 16.

FIG. 17 is an enlarged view of a portion A in FIG. 16, and the driven roller 71 includes a wheel 73 provided in a body portion 72. The wheel 73 is formed of, for example, a metallic material, and a plurality of tooth portions 73*a* are formed along an outer periphery of the wheel 73.

A shaft hole 72*a* is formed in the body portion 72, a shaft portion 71*a* is inserted into the shaft hole 72*a*, so that the body portion 72 is rotatable with respect to the shaft portion 71*a*. The roller support frame 70 includes a shaft support portion 70*b*, and the shaft portion 71*a* is supported by the shaft support portion 70*b*. In the present embodiment, the shaft portion 71*a* is fitted to the shaft support portion 70*b* by snap fitting, but may be supported by using any method.

The shaft portion 71*a* can be formed by a bar spring as an example, and in this case, the driven roller 71 can be displaced in the Z-axis direction within a range of deformation of the shaft portion 71*a*. Here, the shaft portion 71*a* may be formed of a metallic shaft or a resinous shaft.

When the head surface 42*a* is viewed in plan view from the −Z direction as illustrated in FIG. 16, the driven roller 71 enters the region of the line head 40.

To be specific, the upstream cutout portion 42*b* and the downstream cutout portion 42*c* are formed in the peripheral edge of the plate member 42 forming the head surface 42*a*, as described above. The driven roller 71 enters each cutout portion in plan view of the head surface 42*a*.

In addition, the driven roller 71 enters the concave portions 41*b* formed in the base 41 of the line head 40 in the Z-axis direction as illustrated in FIG. 13. A lower end portion of the driven roller 71 protrudes in the −Z direction from the head surface 42*a*. In FIG. 13, reference sign Hg denotes an amount of protrusion by which the driven roller 71 protrudes in the −Z direction from the head surface 42*a*, and an amount of protrusion Hg can be set to be larger than 0 mm and equal to or smaller than 5.0 mm as an example.

In the present embodiment, a portion of the driven roller 71 enters the upstream cutout portion 42*b* and the downstream cutout portion 42*c* in plan view of the head surface 42*a*, but the entire driven roller 71 may enter the upstream cutout portion 42*b* and the downstream cutout portion 42*c*.

Further, in the present embodiment, the driven roller 71 is provided at an upstream position and a downstream position of the line head 40, but may be provided at any one of the upstream position and the downstream position.

In the present embodiment, a plurality of driven rollers 71 are provided along the medium width direction as illustrated in FIGS. 14, 15, and 16.

More specifically, the driven roller 71 provided at the upstream position in the medium transport direction in the present embodiment is disposed between the two head chips 43 adjacent in the medium width direction. Further, in the present embodiment, the driven roller 71 provided at the downstream position in the medium transport direction is disposed between the two head chips 43 adjacent in the medium width direction and is disposed on the outer side with respect to the head chip 43 located at the endmost portion.

Next, the roller support frame 70 is supported by the main frame 7 constituting the base of the printer 1 at both end portions in the medium width direction. A structure for supporting the roller support frame 70 in the present embodiment is the same as a structure for supporting the facing portion 50.

Figure 19:
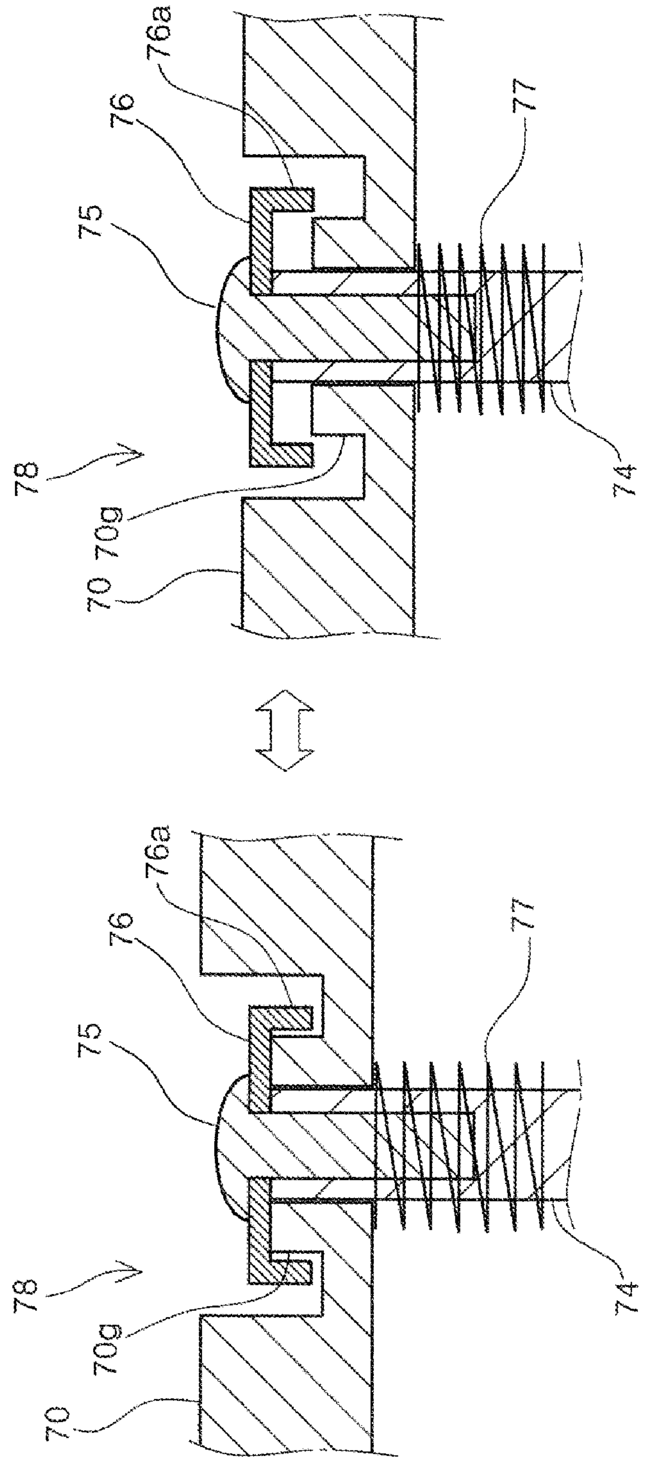
FIG. 19 is a cross-sectional view of a support structure that supports the roller support frame.

FIG. 19 illustrates the support structure 78 that supports the roller support frame 70. The support structure 78 includes a guide shaft 74, a cylindrical portion 70*g*, a stopper 76, a screw 75, and a pressing spring 77.

More specifically, the guide shaft 74 is provided in the main frame 7. The cylindrical portion 70*g* is formed in the roller support frame 70, and the guide shaft 74 enters the cylindrical portion 70*g*. Thus, the cylindrical portion 70*g*, that is, the roller support frame 70 is provided to be displaceable in the Z-axis direction.

The pressing spring 77 which is an example of a pressing member is provided in the guide shaft 74, and the roller support frame 70 is pressed in the +Z direction by the pressing spring 77.

An upper end portion of the guide shaft 74 is configured as a screw hole into which the screw 75 can be fitted. The stopper 76 enters between the screw 75 and the upper end portion of the guide shaft 74, and the stopper 76 is fixed to the guide shaft 74 by the screw 75. The stopper 76 prescribes a movement limit of the cylindrical portion 70*g*, that is, the roller support frame 70 in the +Z direction. That is, the stopper 76 is a movement prescribing portion that prescribes the movement limit of the roller support frame 70 in the direction to the line head 40, which is a portion on which an upper end of the cylindrical portion 70*g* abuts.

Although not illustrated in the drawings, the stopper 76 has a disk-like shape when viewed from the Z-axis direction, and a covering portion 76*a* is formed to hang downward from the outer peripheral portion.

An upper end portion of the cylindrical portion 70*g* is covered by the covering portion 76*a*.

A left drawing of FIG. 19 illustrates a state in which the line head 40 is spaced apart from the roller support frame 70, and a right drawing of FIG. 19 illustrates a state in which the line head 40 presses down the roller support frame 70.

As illustrated in FIG. 15, the support structures 78 described above are provided at both end portions of the roller support frame 70 in the medium width direction, and are provided with interval therebetween in the Y-axis direction at both the end portions of the roller support frame 70.

The two support structures 78 located at the end portions in the +X direction in the medium width direction are at the same position in the X-axis direction, and the two support structures 78 located at the end portion in the −X direction are also at the same position in the X-axis direction.

In addition, four support structures 78 are provided in the present embodiment, but the present disclosure is not limited thereto, and a plurality of support structures 78 may be provided. However, it is possible to stably support the roller support frame 70 by providing three support structures 78. When the three support structures 78 are provided, it is preferable that, for example, two of the support structures 78 are provided at one end portion in the medium width direction and one of the support structures 78 is provided at the other end portion. Further, in this case, it is preferable that the one support structure 78 is provided between the two support structures 78 in the Y-axis direction, particularly, at an intermediate position.

Figure 18:
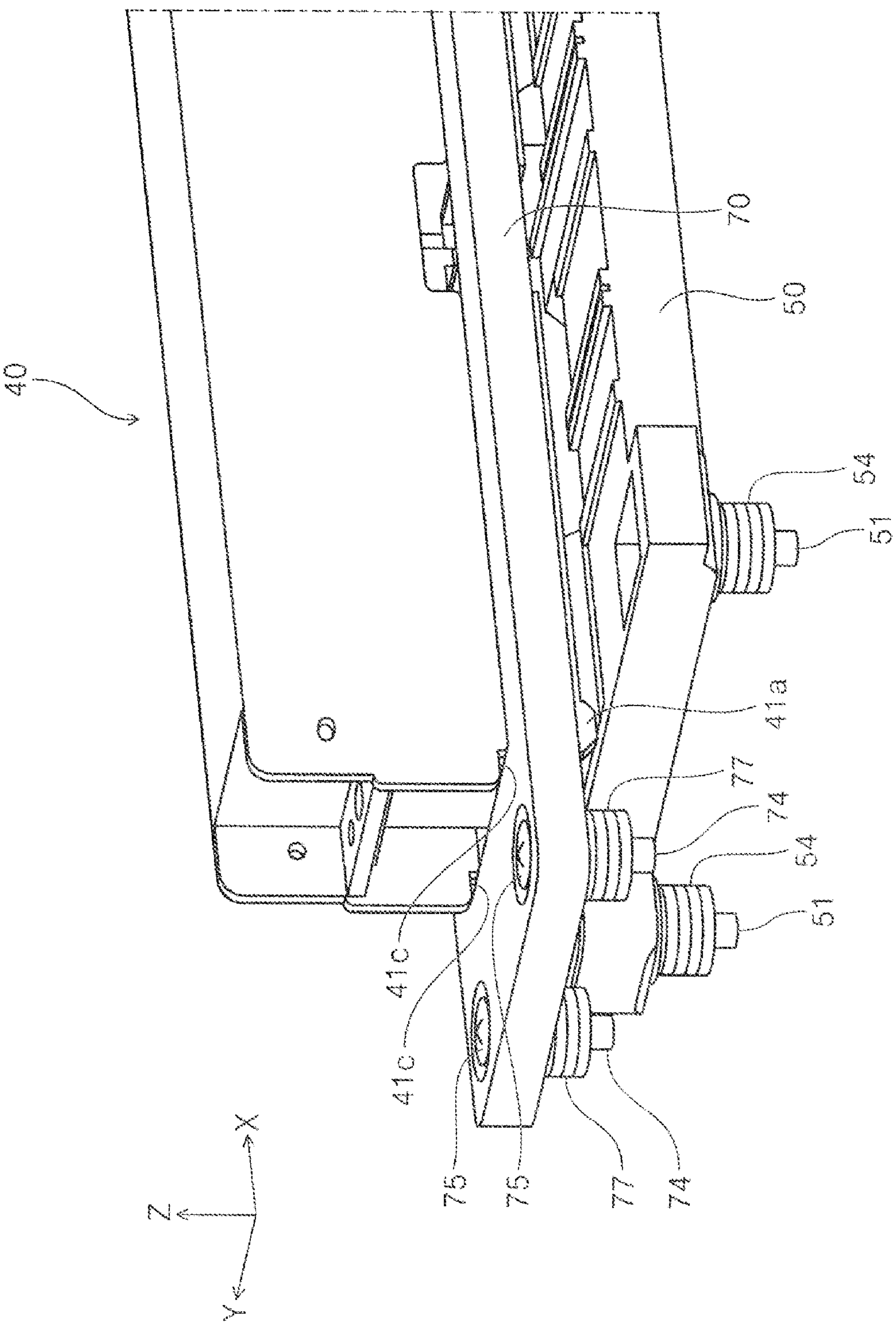
FIG. 18 is a perspective view of a portion in which the line head abuts on the roller support frame and the facing portion.

As illustrated in FIGS. 6, 9, and 18, the second abutting portions 41*c* are provided with an interval along the medium transport direction at both the end portions of the line head 40 in the medium width direction. As illustrated in FIG. 18, the second abutting portion 41*c* is a portion that abuts on the roller support frame 70. The opening portion 70*a* formed in the roller support frame 70 is formed so that a size thereof in the medium transport direction is larger than that of the line head 40 and a size thereof in the medium width direction is smaller than a formation interval of the second abutting portion 41*c* in the medium width direction. Accordingly, the lower side of the line head 40 protrudes below the opening portion 70*a*, and the second abutting portion 41*c* can abut on the roller support frame 70.

When the line head 40 is at the recording position, the second abutting portion 41*c* is slightly spaced apart from the roller support frame 70. The second abutting portion 41*c* abuts on the roller support frame 70 in a process in which the line head 40 is lowered from the recording position to the cap position. When the line head 40 is further lowered after the second abutting portion 41*c* abuts on the roller support frame 70, the line head 40 presses down the roller support frame 70 against the pressing force of the pressing spring 77. This series of operations of the roller support frame 70 are the same as those of the facing portion 50 described above.

The second abutting portion 41*c* abuts on the roller support frame 70 between the two support structures 78 provided with an interval in the Y-axis direction. Accordingly, the distance between the first abutting portion 41*a* and the support structure 55 does not become too long, and the cylindrical portion 50*g* can smoothly move with respect to the guide shaft 51 illustrated in FIG. 11.

In the present embodiment, two second abutting portions 41*c* are provided at an end portion in the X-axis direction with an interval along the Y-axis direction, but the present disclosure is not limited thereto and one or three or more second abutting portions 41*c* may be provided. When one second abutting portion 41*c* is provided at the end portion in the X-axis direction, it is preferable to press the roller support frame 70 at an intermediate position between the two support structures 78 provided with an interval in the Y-axis direction. In addition, when the two second abutting portions 41*c* are provided with an interval along the Y-axis direction at the end portion in the X-axis direction as in the present embodiment, it is preferable that the two second abutting portions 41*c* are disposed at positions symmetrical with respect to the intermediate position between the two support structures 78.

A timing at which the line head 40 starts to press down the roller support frame 70 may be equal to or different from a timing at which pressing down the facing portion 50 is started. However, when the timing at which the line head 40 starts to press down the roller support frame 70 is different, it is possible to reduce a temporary load applied to the head movement motor 81 that moves the line head 40 up and down, which is preferable.

Figure 20:
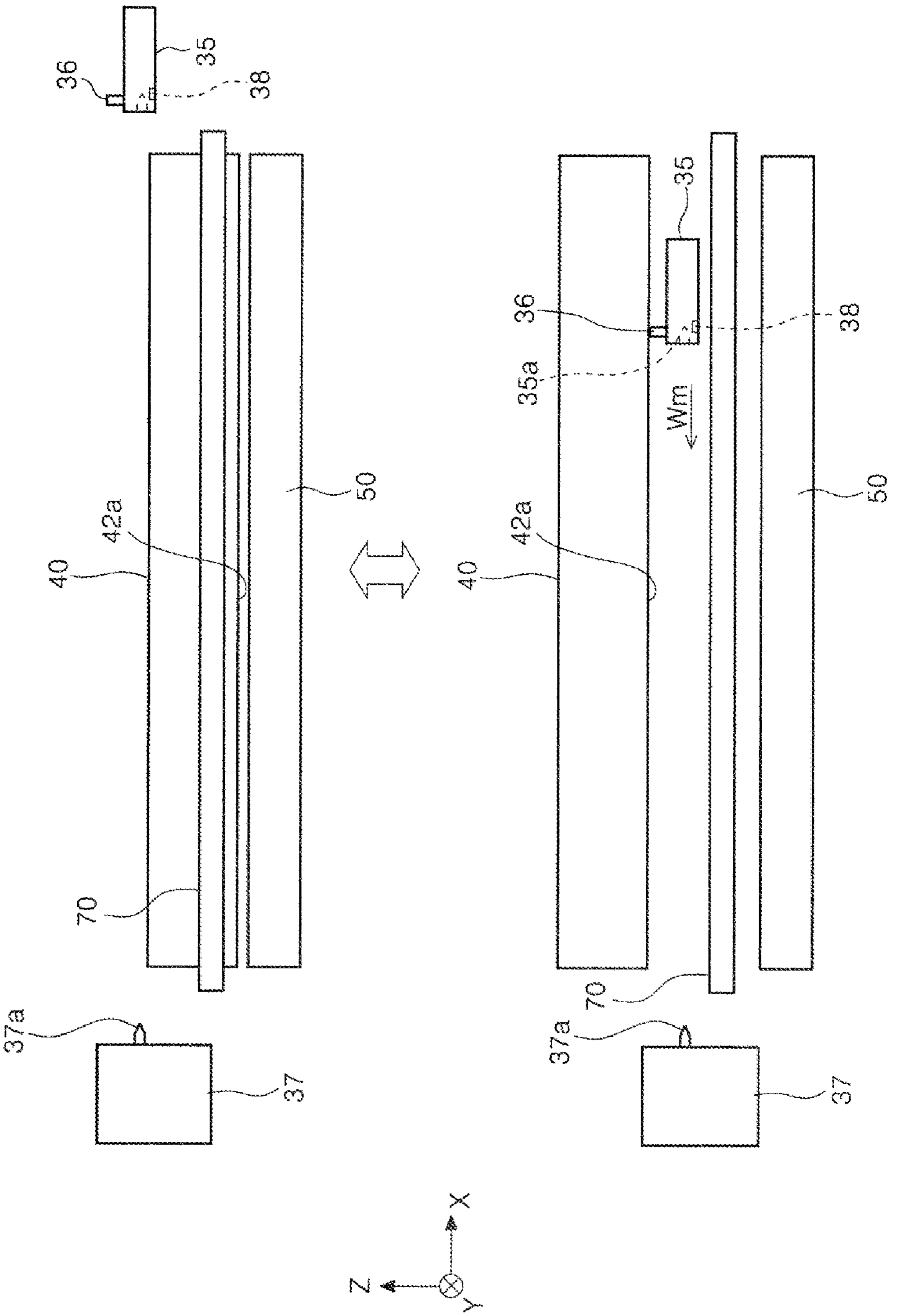
FIG. 20 is an operation transition diagram when the line head moves between the recording position and the wiping position.

Next, FIG. 20 illustrates the movement of the line head 40 when the wiper 36 wipes the head surface 42*a*. An upper diagram of FIG. 20 illustrates a state in which the line head 40 is at the recording position. When the head surface 42*a* is wiped by the wiper 36 from this state, the line head 40 is moved upward to the wiping position as shown by change from the upper drawing to a lower drawing in FIG. 20.

In this case, since the roller support frame 70 and the line head 40 are configured as separate bodies, only the line head 40 moves upward while the position of the roller support frame 70 in the Z-axis direction is maintained. Accordingly, a gap is formed so that the wiper 36 enters is formed between the roller support frame 70 and the line head 40. Accordingly, a gap is formed so that the wiper carriage 35 enters between the line head 40 and the roller support frame 70, and the wiper 36 can abut on the head surface 42*a*. In this state, it is possible to wipe the head surface 42*a* with the wiper 36 by moving the wiper carriage 35 as indicated by an arrow Wm.

Further, in this state, when the wiper 36 wipes the head surface 42*a*, interference between the wiper 36 and the driven roller 71 can be avoided.

As described above, the line head 40 includes the plurality of head chips 43 including the nozzles 44 in the plate member 42 facing the facing portion 50. The upstream cutout portion 42*b* and the downstream cutout portion 42*c* are formed in the peripheral edge of the plate member 42 in order to avoid the head chip 43. The driven roller 71 that is rotatable in a driven manner in contact with the medium are disposed in the upstream cutout portion 42*b* and the downstream cutout portion 42*c*. Accordingly, effects of curbing floating of the medium by the driven roller 71 is easily exhibited in the region of the plate member 42, and head rubbing of the medium can be curbed more reliably.

Further, the plurality of head chips 43 are alternately disposed at the upstream position and the downstream position along the medium width direction which is the direction intersecting with the medium transport direction, and the upstream cutout portion 42*b* and the downstream cutout portion 42*c* enter between two head chips 43 adjacent in the medium width direction.

With such a configuration, it is possible to dispose the driven roller 71 at a position closer to the head chip 43, and to further reliably curb head rubbing of the medium.

In the present embodiment, a portion of the driven roller 71 enters between two head chips 43 adjacent in the medium width direction. This makes it possible to more reliably curb head rubbing of the medium.

In addition, since the driven roller 71 and the cutout portion for disposition of the driven roller 71 are provided upstream and downstream in the medium transport direction in the plate member 42, it is possible to further reliably curb head rubbing of the medium.

In addition, since the plurally of upstream cutout portion 42*b*, downstream cutout portion 42*c*, and driven roller 71 are provided along the medium width direction, it is possible to curb head rubbing of the medium in a wide region in the medium width direction.

Further, the driven roller 71 is supported by the roller support frame 70 provided independently of the line head 40, which is a frame located between the line head 40 and the facing portion 50 in the movement direction of the line head 40. By the line head 40 moving from the recording position to the wiping position, a gap is formed so that the wiper 36 enters between the roller support frame 70 and the line head 40.

Therefore, when the head surface 42*a* is wiped by the wiper 36, the driven roller 71 is located at a place away from the head surface 42*a*. Accordingly, the driven roller 71 does not interfere with the wiper 36 when the head surface 42*a* is wiped by the wiper 36.

Further, the roller support frame 70 is displaceable along the movement direction of the line head 40, and is pressed toward the line head 40 by the pressing spring 77, and the line head 40 abuts on the roller support frame 70 in the process in which the line head 40 moves from the recording position to the cap position, and moves the roller support frame 70 against pressing force of the pressing spring 77. With such a configuration, when the line head 40 moves to the cap position, it is possible to curb the roller support frame 70 obstructing the movement of the line head 40.

As a means for curbing the head rubbing of the medium, a protrusion member 91 to be described below may be adopted instead of the driven roller 71 described above or in addition to the driven roller 71 described above. Hereinafter, a configuration in which the protrusion member 91 is provided will be described.

Figure 22:
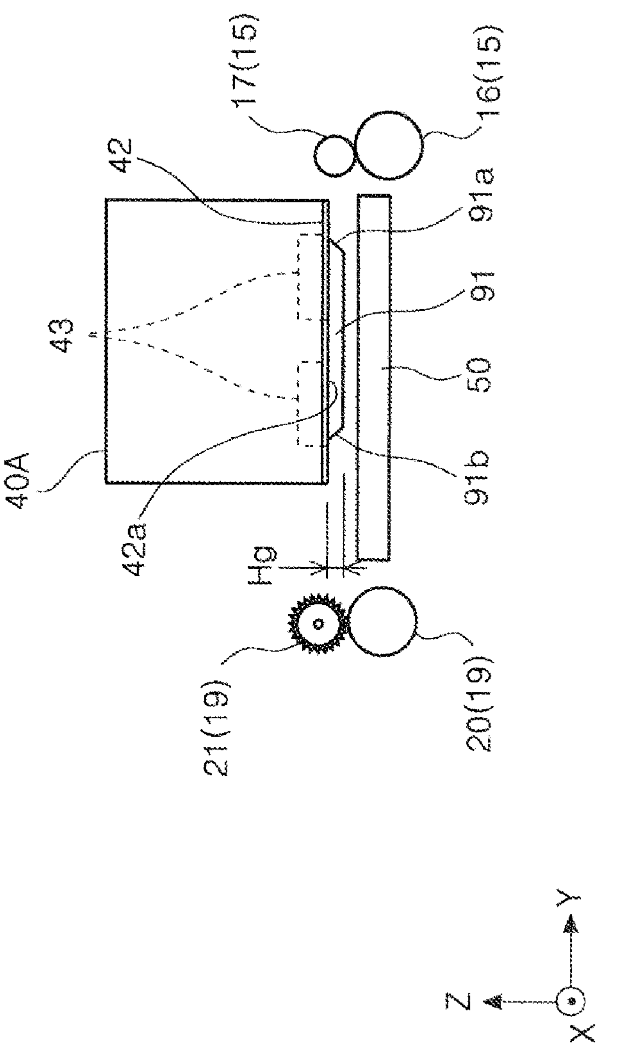
FIG. 22 is a view illustrating a portion of a medium transport path including the line head provided with the protrusion member.

As illustrated in FIG. 22, the protrusion member 91 is provided between the first transport roller pair 15 and the second transport roller pair 19 in the medium transport direction. The protrusion member 91 is disposed at a position overlapping the line head 40A in the medium transport direction.

In the present embodiment, the protrusion member 91 is a rib-shaped member that protrudes from the plate member 42 to the facing portion 50. The protrusion member 91 can be formed of a resin material and, the protrusion member 91 can be formed of, for example, polyoxymethylene (POM).

The protrusion member 91 can be fixed to an exposure portion (not illustrated) in which the plate member 42, the head chip 43, or a portion of the base 41 constituting a base body of the line head 40A is exposed, by a fixing means such as bonding, welding, or press-fitting.

Figure 21:
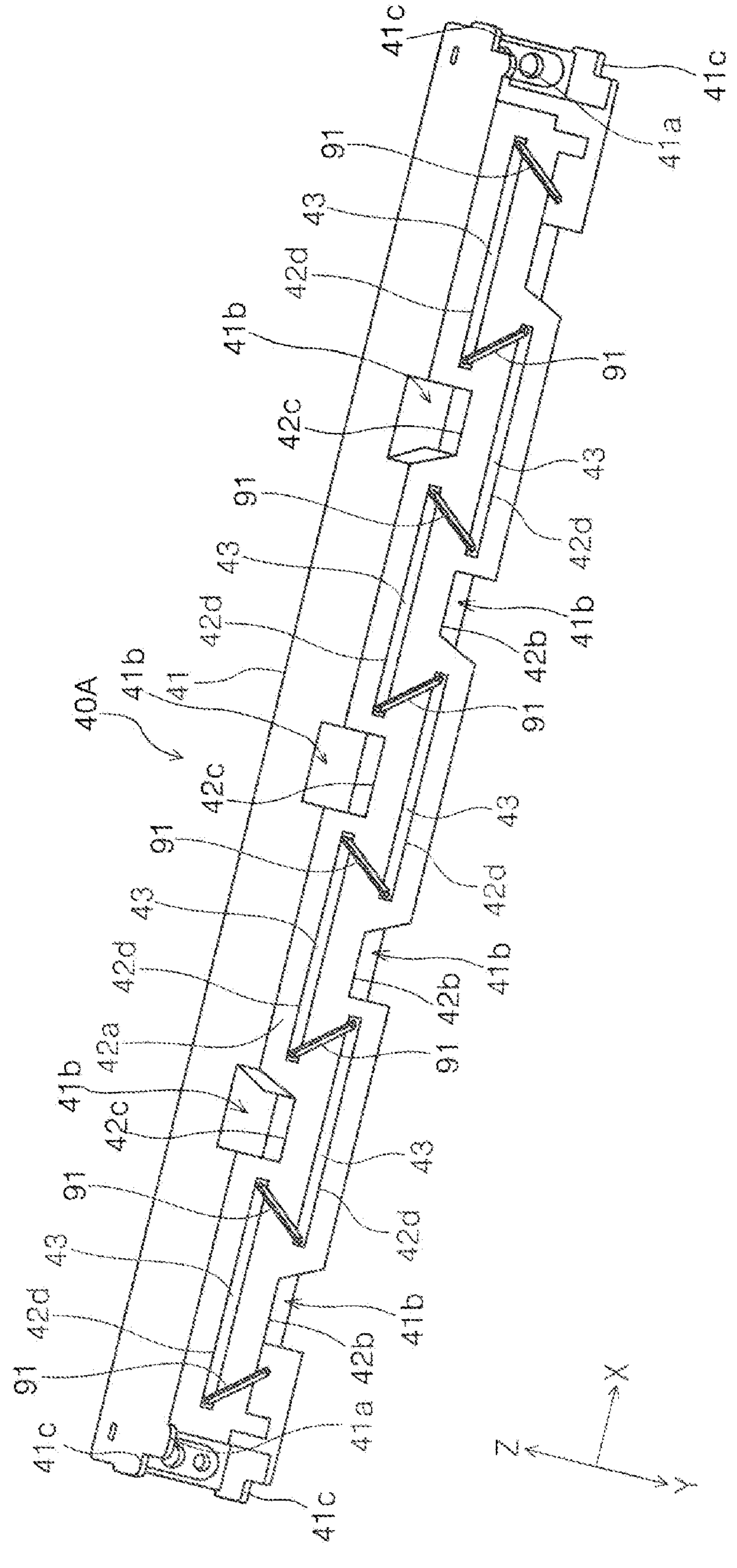
FIG. 21 is a perspective view of the line head provided with a projecting member.
Figure 23:
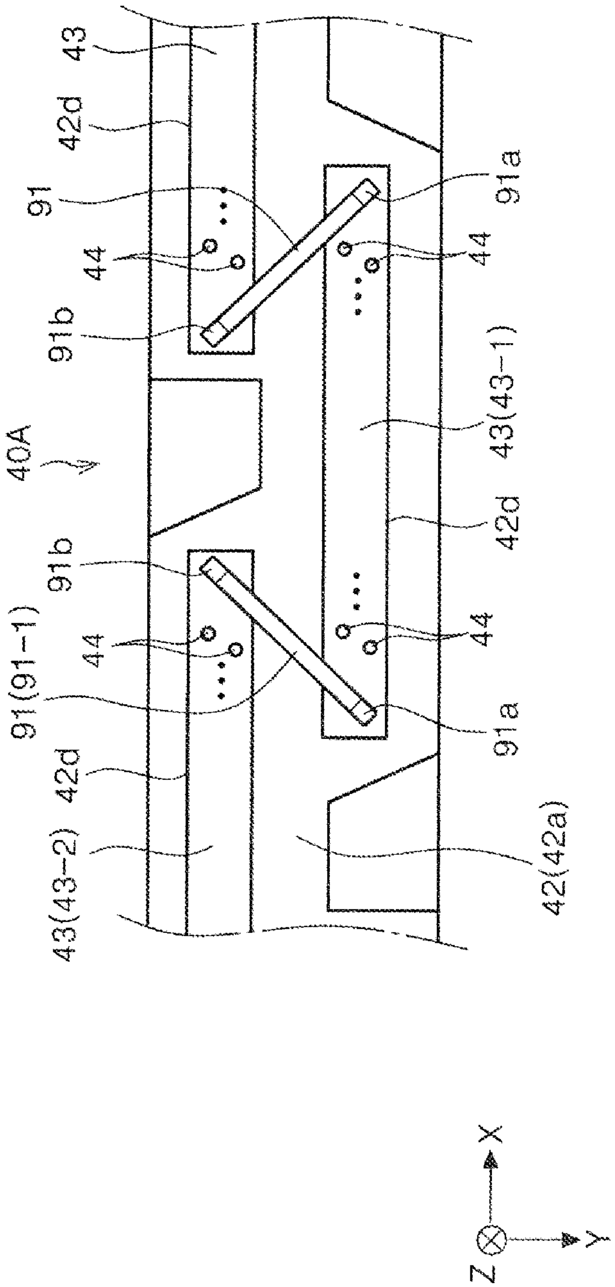
FIG. 23 is a plan view illustrating a portion of the line head provided with the projecting member.

As illustrated in FIGS. 21 and 23, when the head surface 42*a* is viewed in plan view from the −Z direction, the protrusion member 91 enters a region of the line head 40A. In the present embodiment, the cap portion 61 described above is formed in a shape that does not interfere with the protrusion member 91.

The protrusion member 91 is disposed to avoid the nozzle 44. Further, in the present embodiment, the protrusion member 91 is provided to couple end portions of the two head chips 43. For example, the −X direction is set as a first direction, the +X direction is set as a second direction, and a protrusion member 91-1 in FIG. 23 is provided to couple an end portion in the −X direction of a head chip 43-1 disposed at an upstream position to an end portion in the +X direction of a head chip 43-2 located downstream of the end portion in the −X direction in the medium transport direction. Of course, contrary to the above description, the +X direction may be set as the first direction, and the −X direction may be set as the second direction to ascertain the disposition of the protrusion members 91.

Figure 24:
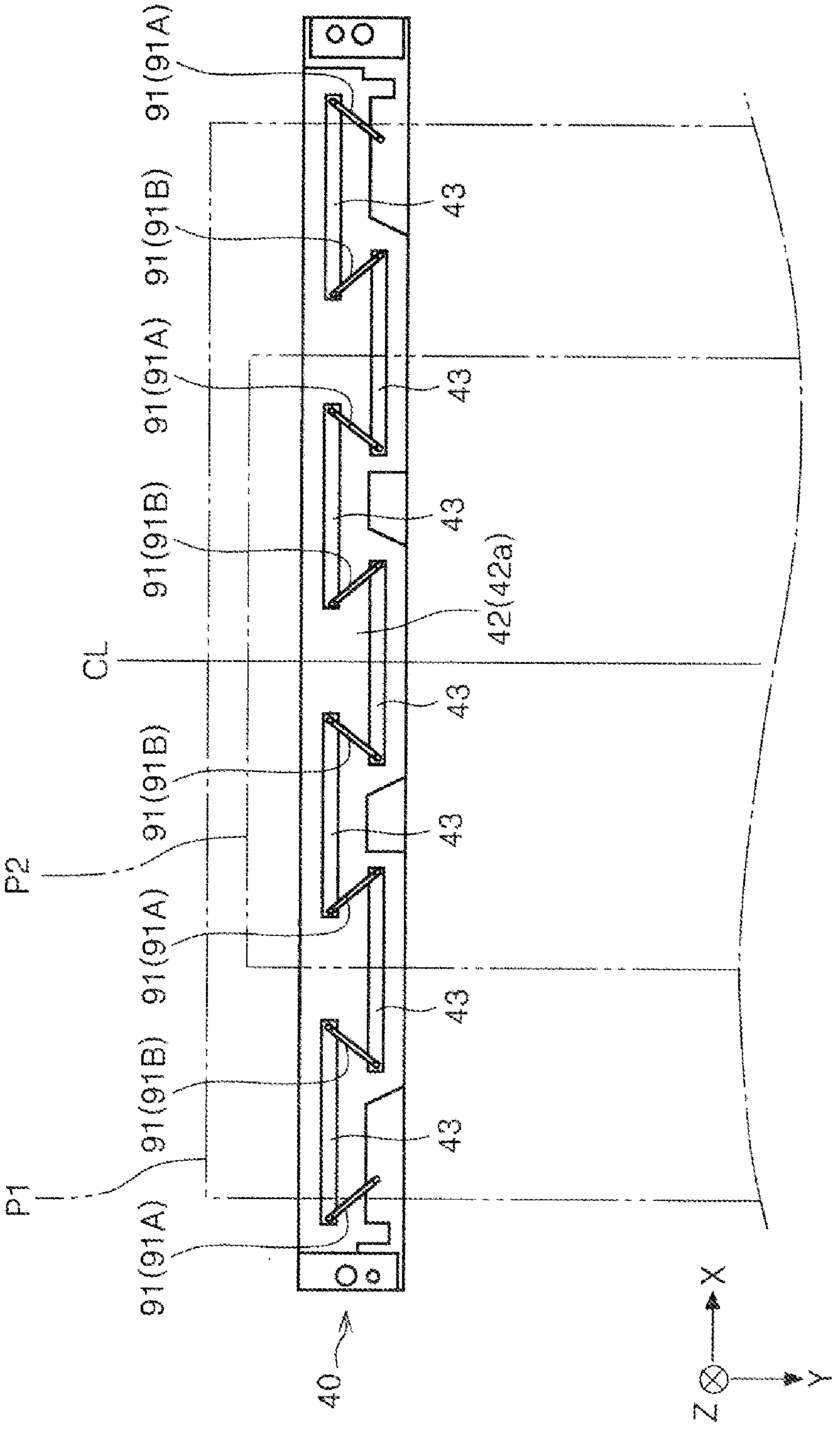
FIG. 24 is a plan view illustrating the entire line head provided with the projecting member.

In the present embodiment, as illustrated in FIGS. 21 and 24, the protrusion member 91 is disposed at the end portions of all the head chips 43. Only one end of the protrusion members 91 provided at both end portions in the medium width direction is disposed at the end portion of the head chip 43.

In the present embodiment, the protrusion member 91 covers the entire disposition region of the nozzles 44 in the medium transport direction.

In FIG. 24, reference sign CL denotes a center position of the medium in the medium width direction. The center position of the medium in the medium width direction is a center position CL regardless of the size.

As illustrated in the drawing, the head chips 43 are disposed to be bilaterally symmetrical with respect to the center position CL in the medium width direction. Similarly, the protrusion members 91 are disposed to be bilaterally symmetrical with respect to the center position CL in the medium width direction.

In FIG. 24, reference sign 91A denotes a first protrusion member that extends in the −Y direction, that is from the center position CL to a side end of the medium in the medium width direction from upstream to downstream in the medium transport direction. Reference sign 91B denotes a second protrusion member that extends in the −Y direction, that is, from upstream to downstream in the medium transport direction and from the side end of the medium to the center position CL in the medium width direction.

In a plurality of protrusion members 91, a second protrusion members 72B and a first protrusion members 91A are alternately disposed from the center position CL to the side end of the medium, and an outermost side in the medium width direction is a first protrusion member 91A.

In FIG. 22, reference sign Hg denotes an amount of protrusion by which the protrusion member 91 protrudes in the −Z direction from the head surface 42*a*, and the amount of protrusion Hg can be set to be larger than 0 mm and equal to or smaller than 5.0 mm as an example.

A chamfered portion 91*a* is formed at a corner portion at an upstream end of the protrusion member 91 in the medium transport direction. A chamfered portion 91*b* is formed at a corner portion at a downstream end of the protrusion member 91 in the medium transport direction.

The chamfered portions 91*a* and 91*b* may be formed in an R shape instead of the chamfered shape.

As described above, the plate member 42 is provided with the head chip 43 having the nozzles 44, and the protrusion member 91 that protrudes from the plate member 42 to the facing portion 50, which is a rib-shaped member disposed to avoid the nozzles 44 provided in the head chip 43. Therefore, effects of curbing floating of the medium by the protrusion member 91 is easily exhibited in the region of the plate member 42, and head rubbing of the medium can be curbed more reliably.

The protrusion member 91 extends in the direction intersecting the medium transport direction. This makes it possible to obtain the head rubbing curbing effect by one protrusion member 91 in a wide range in the direction intersecting the medium transport direction. As a result, since head rubbing of the medium can be effectively curbed, and the number of the protrusion members 91 can be reduced, an increase in the cost of the apparatus can be curbed.

Further, in the present embodiment, the head chip 43 extends in the medium width direction which is a direction orthogonal to the medium transport direction, and the plurality of head chips 43 are alternately disposed at the upstream position and the downstream position along the medium width direction. The protrusion member 91 is provided to couple an end portion in the first direction of the head chip 43 disposed at the upstream position to an end portion in the second direction of the head chip 43 located downstream in the medium transport direction with respect to an end portion in the first direction.

Accordingly, in a region in which the protrusion member 91 avoids the nozzle 44, the protrusion member 91 can cover a wide range in the medium transport direction, and head rubbing of the medium can be more effectively curbed.

Further, since the corner portion at the upstream end of the protrusion member 91 in the medium transport direction is formed in the chamfered shape or the R shape, it is possible to curb the leading end of the medium being caught by the protrusion member 91 when the medium is transported from upstream to downstream in the medium transport direction.

Further, since the corner portion at the downstream end of the protrusion member 91 in the medium transport direction is formed in the chamfered shape or the R shape, it is possible to curb the leading end of the medium being caught by the protrusion member 91 when the medium is transported from downstream to upstream in the medium transport direction.

Further, as described with reference to FIG. 24, the plurality of protrusion members 91 include the first protrusion member 91A extending toward the −Y direction, that is, from upstream to downstream in the medium transport direction and from the center position CL to the side end of the medium in the medium width direction, and a second protrusion member 91B extending in the −Y direction, that is, from upstream to downstream in the medium transport direction and from the side end of the medium to the center position CL in the medium width direction.

In FIG. 24, reference sign P1 denotes a first medium, which is, for example, an A4 size sheet of which a short side direction is along the medium width direction. Further, reference sign P2 denotes a second medium, and is, for example, an A6 size sheet of which a short side direction is along the medium width direction.

Such a medium with a predetermined standard size passes through a position at which a side end in the medium width direction deviates from the second protrusion member 91B.

Accordingly, the following operational effects are obtained. That is, when the side end of the medium in the medium width direction passes a position of the second protrusion member 91B, a corner portion at the leading end of the medium is easily caught by the second protrusion member 91B, and jamming easily occurs. On the other hand, even when the corner portion at the leading end of the medium is caught by the first protrusion member 91A, the corner portion is guided in an outward direction, and it is difficult for jamming to occur.

As described above, since the medium with the predetermined standard size passes through the position at which the side end of the medium in the medium width direction deviates from the second protrusion member 91B, it is possible to curb the occurrence of the jamming.

Depending on the amount of protrusion from the head surface 42*a* or the hardness of the wiper 36, the above-described protrusion member 91 may be an obstacle to the wiping of the head surface 42*a* by the wiper 36.

Therefore, the protrusion member 91 may be provided independently of the line head 40 and configured to be separated from the head surface 42*a* when the line head 40 has moved to the wiping position.

Figure 25:
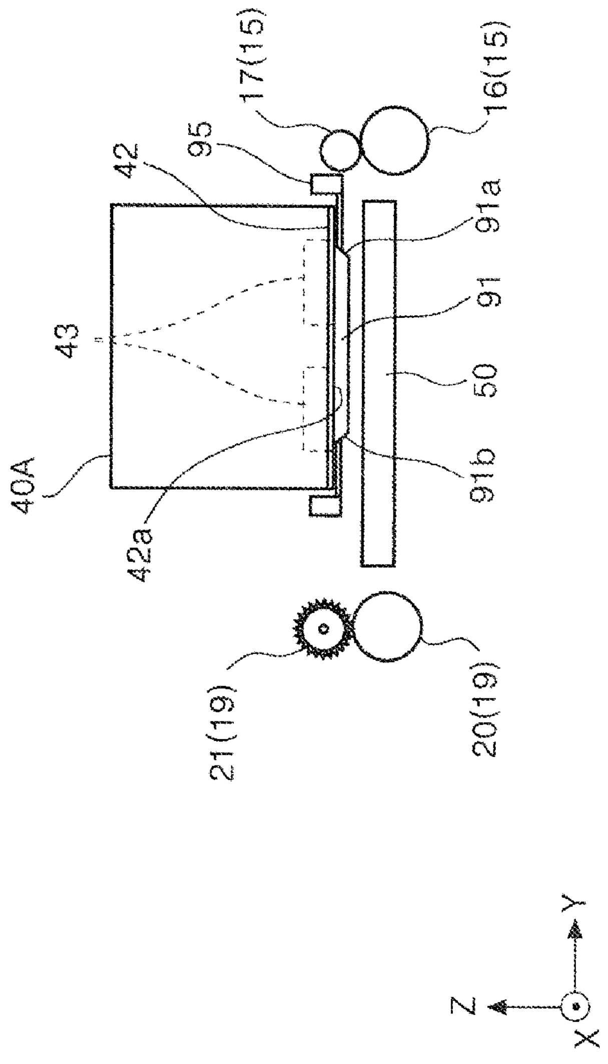
FIG. 25 is a diagram illustrating a portion of a medium transport path in a configuration in which the protrusion member is independent of the line head.
Figure 26:
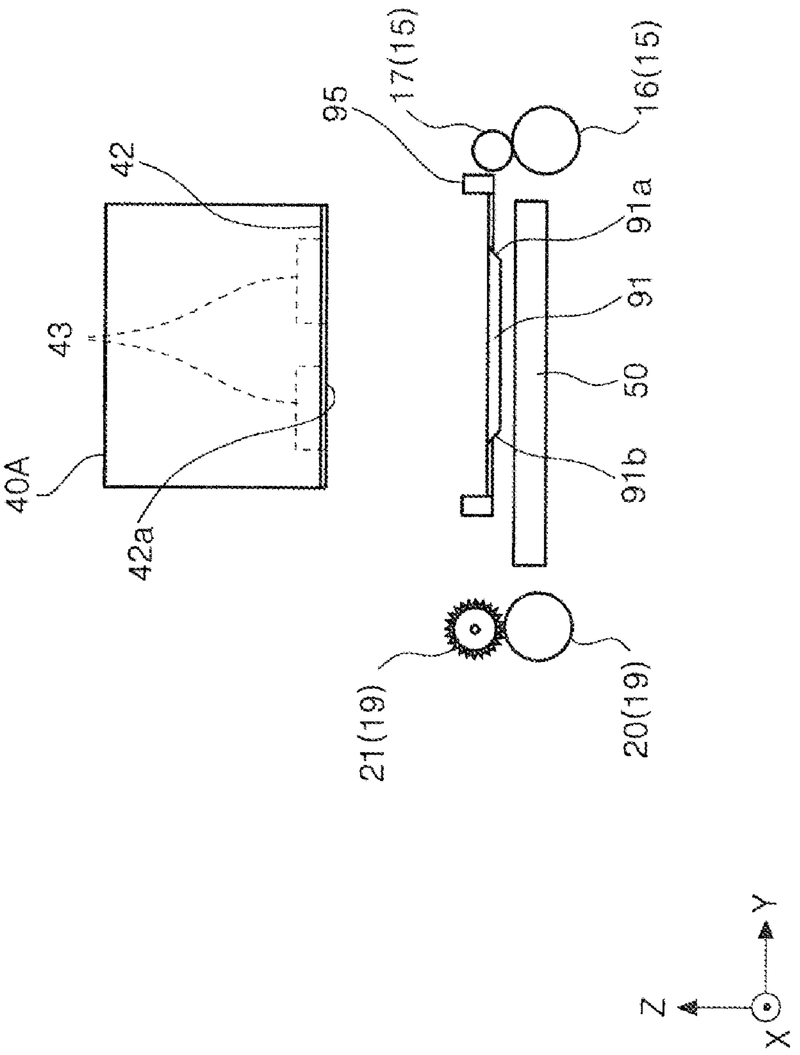
FIG. 26 is a diagram illustrating the portion of the medium transport path in the configuration in which the protrusion member is independent of the line head.

FIGS. 25 and 26 illustrate the line head 40A configured in this manner, FIG. 25 illustrates a state in which the line head 40A is at the recording position, and FIG. 26 illustrates a state in which the line head 40A is at the wiping position.

Figure 27:
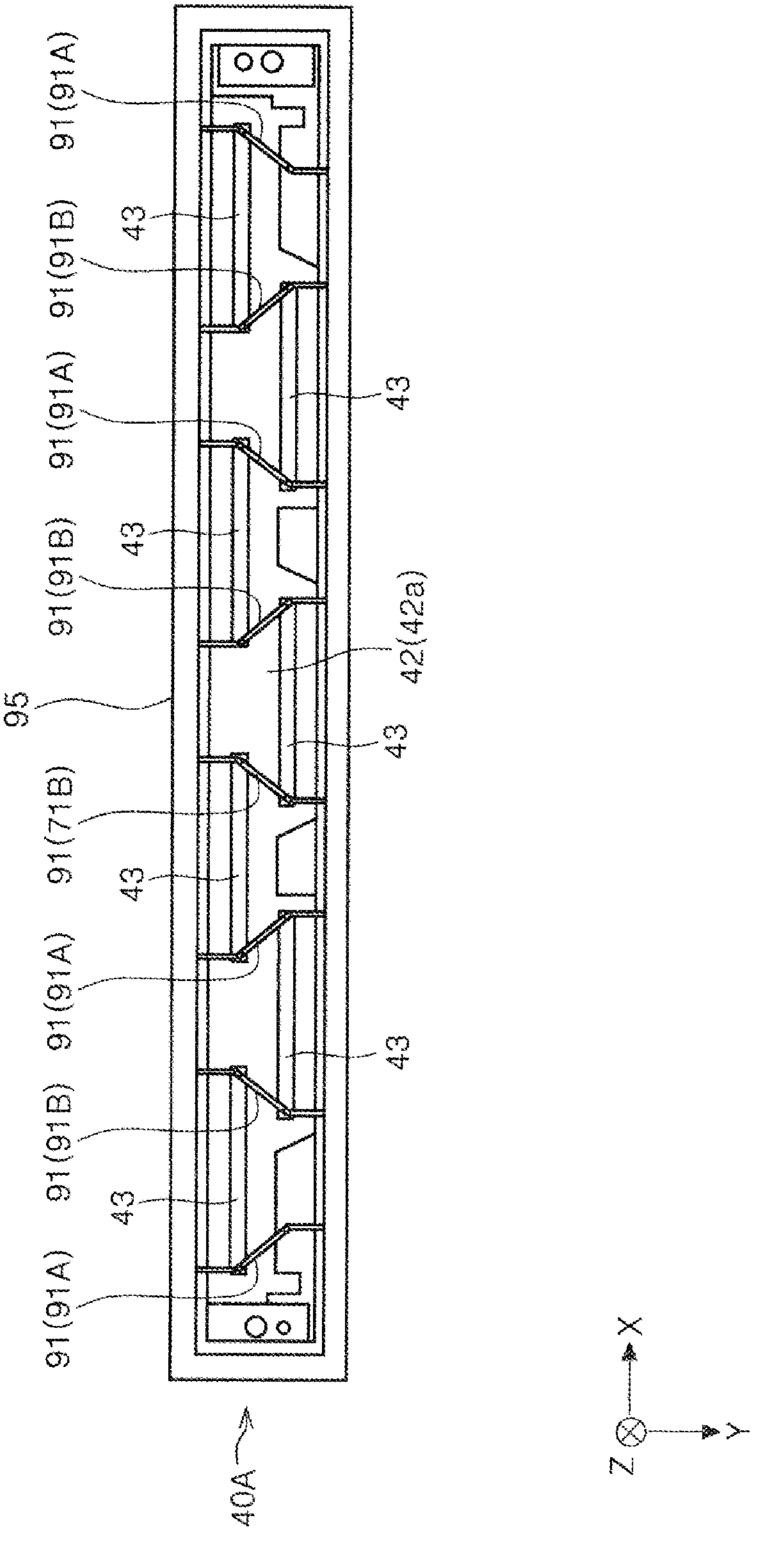
FIG. 27 is a plan view of a line head and a protrusion member in the configuration in which the protrusion member is independent of the line head.

In the present embodiment, the protrusion member 91 is provided in a support member 95. The support member 95 has a shape surrounding the periphery of the plate member 42 as illustrated in FIG. 27 in a state in which the line head 40A is at the recording position, and is provided in the main frame 7 independently of the line head 40A. The protrusion member 91 is also provided independently of the line head 40A, similar to the support member 95.

Since the support member 95 and the protrusion member 91 are provided independently of the line head 40A, the head surface 42*a* is separated from the protrusion member 91 when the line head 40A moves from the recording position to the wiping position as illustrated in change from FIG. 25 to FIG. 26. Accordingly, a gap that the wiper carriage 35 enters is formed between the head surface 42*a*, and the support member 95 and the protrusion member 91, making it possible to wipe the head surface 42*a* with the wiper 36 without being affected by the protrusion member 91.

In the present embodiment, the protrusion member 91 becomes an obstacle when the line head 40A moves from the recording position to the cap position. Therefore, the support member 95 may be provided to be displaceable in a direction in which the support member 95 moves forward and backward with respect to the line head 40A and may be pressed toward the line head 40A by a pressing member (not illustrated), similarly to the facing portion 50 described above. In this case, the upward movement limit position of the support member 95 is regulated by a regulation portion (not illustrated) that abuts against the support member 95.

With this configuration, when the line head 40A moves from the recording position to the cap position, the line head 40A can press down the protrusion member 91, that is, the support member 95, and as a result, the line head 40A can move from the recording position to the cap position.

Next, the edge detection unit 38 provided in the wiper carriage 35 will be described.

Figure 28:
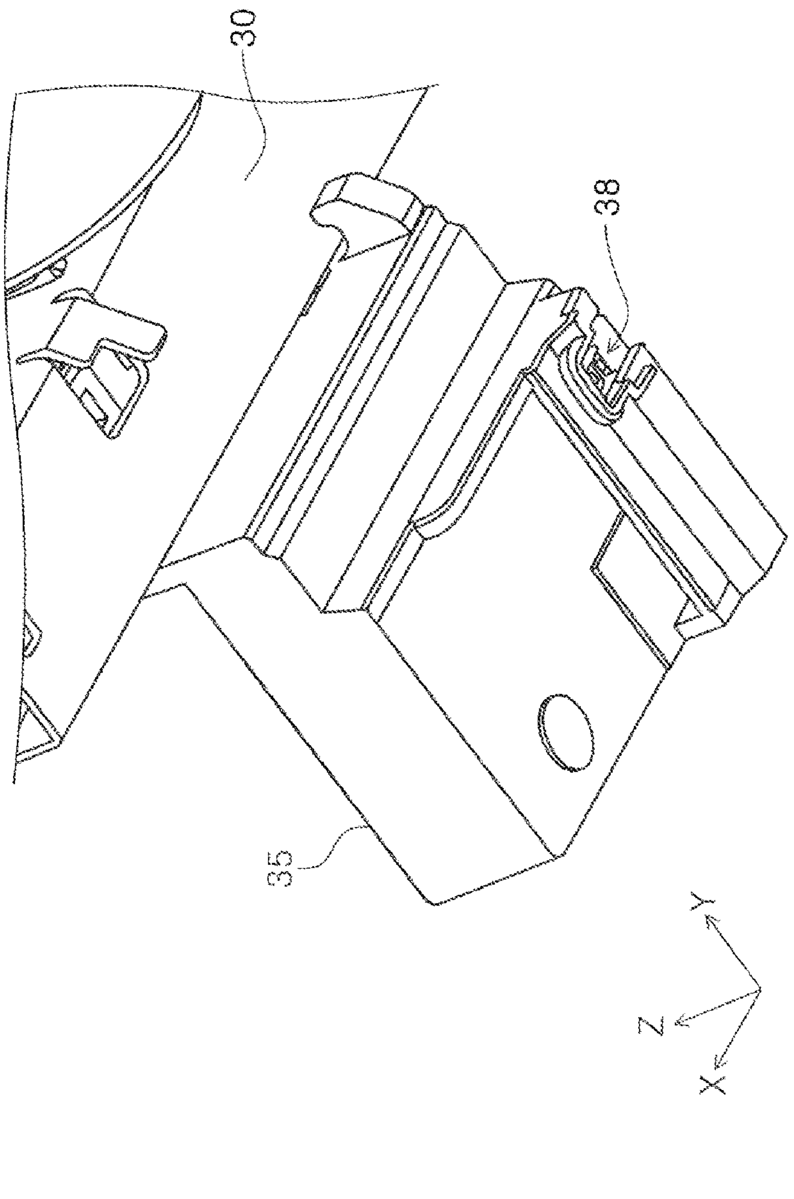
FIG. 28 is a perspective view of the wiper carriage when viewed from below.

As illustrated in FIG. 28, the edge detection unit 38 for detecting an edge of the medium is provided at a bottom portion of the wiper carriage 35.

The edge detection unit 38 and the control unit 80 (see FIG. 5) are coupled by a flexible flat cable (not illustrated). The flexible flat cable is deformed following the movement of the wiper carriage 35.

The edge detection unit 38 is an optical sensor, and includes a light emitting unit (not illustrated) that emits detection light toward the facing portion 50 and a light receiving unit (not illustrated) that receives a reflection component of the detection light. The intensity of the reflection component is stronger when the medium is irradiated with the detection light than when the facing portion 50 is irradiated with the detection light. Therefore, the control unit 80 can detect the edge of the medium based on detection information of the edge detection unit 38.

As described with reference to FIG. 12 or 20, since the wiper carriage 35 is movable in the medium width direction and the edge detection unit 38 is provided in the wiper carriage 35, it is possible for the edge detection unit 38 to detect the edge by moving the wiper carriage 35 in the medium width direction in a state in which the medium is positioned at a position at which the medium can be detected by the edge detection unit 38. Here, the edge detection is to detect one or both of the edge in the +X direction and the edge in the −X direction of the medium.

Figure 35:
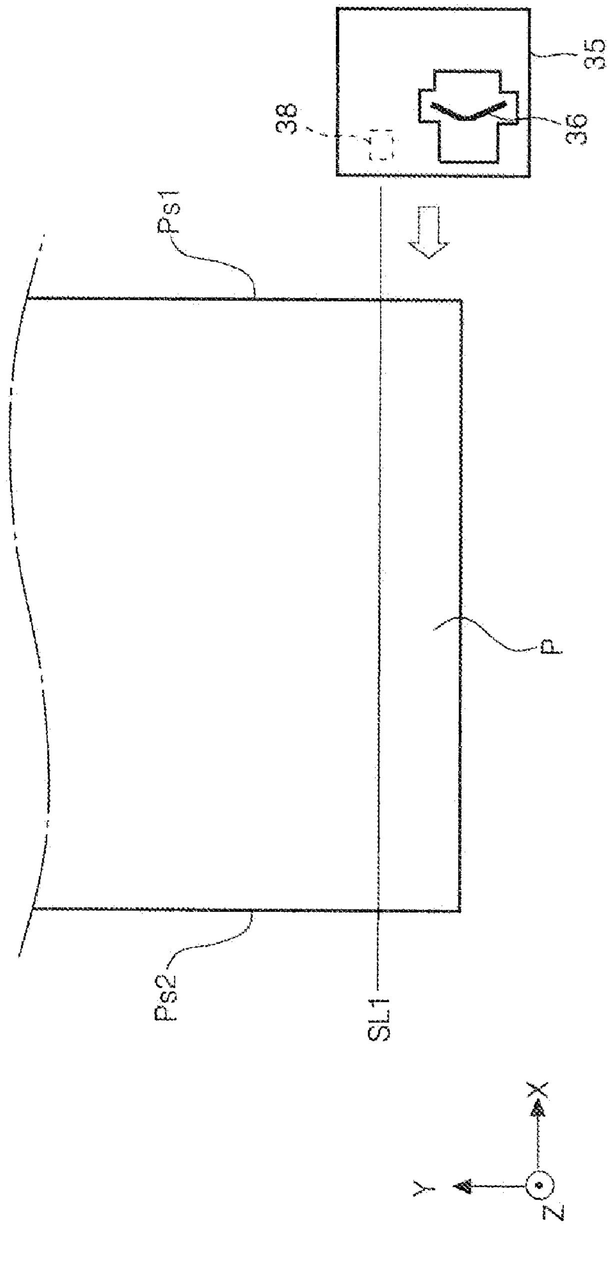
FIG. 35 is a diagram illustrating a positional relationship between an edge detection unit and a medium when edge detection is performed.

In FIG. 35, reference sign Ps1 denotes the edge of the medium P in the +X direction, and reference sign Ps2 denotes the edge of the medium P in the −X direction. Further, a line SL1 is a detection line of the edge detection unit 38. It is possible to detect positions of an edge Ps1 and an edge Ps2 by moving the wiper carriage 35, for example, in an arrow direction (−X direction) in a state in which the medium P is positioned at a position at which the medium P can be detected by the edge detection unit 38, as illustrated in the drawing. As described above, since the wiper drive motor 31 is provided with an encoder sensor (not illustrated) and the control unit 80 can ascertain the current position of the wiper carriage 35, it is possible to detect positions of the edge Ps1 and the edge Ps2 in the medium width direction.

However, it is also possible to detect an edge in the −Y direction, that is, a leading edge of the medium, or an edge in the +Y direction, that is, a trailing edge of the medium, by transporting the medium in a state in which the medium is positioned at a position at which the medium can be detected by the edge detection unit 38 in the medium width direction, for example, at a center position in the medium width direction.

When the detection of the edge of the medium is performed using the edge detection unit 38, the line head 40 may move in the +Z direction from the recording position after the medium is transported to a position at which the medium can face the edge detection unit 38, or may move in the +Z direction from the recording position before the medium is transported to the position at which the medium can face the edge detection unit 38. However, it is possible to improve a printing throughput by moving the line head 40 from the recording position to the wiping position or a spaced position (described below) before the medium is transported to the position at which the medium can face the edge detection unit 38. For example, it is possible to improve the printing throughput by performing a transport operation for transporting the medium to a position at which the medium can face the edge detection unit 38 and the movement operation of the line head 40 in parallel.

Figure 29:
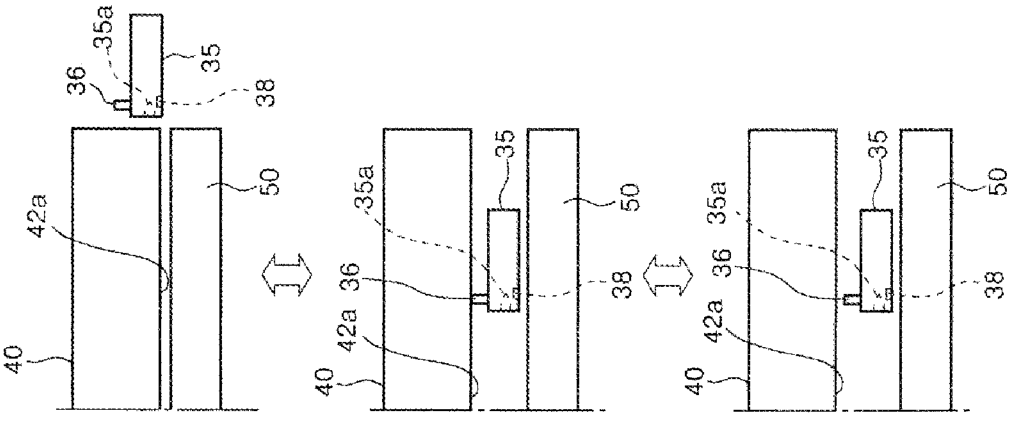
FIG. 29 is a diagram illustrating a position of a line head in a movement region.

The movement region of the line head 40 includes a recording position (an uppermost drawing in FIG. 29) at which recording is performed on the medium. Further, the movement region of the line head 40 includes a position spaced apart from the facing portion 50 as compared to the recording position, which is a wiping position (a drawing at a center in FIG. 29) at which the head surface 42*a* is wiped by the wiper 36. In addition, the movement region of the line head 40 includes a spaced position (a lowermost diagram in FIG. 29) at which the wiper 36 is movable in the medium width direction in a state in which the wiper 36 is spaced apart from the head surface 42*a*, which is a position spaced apart from the facing portion 50 as compared to the wiping position.

As described above, the wiper 36 is provided in the wiper carriage 35 that moves in the medium width direction by the power of the wiper drive motor 31, and the edge detection unit 38 for detecting the edge of the medium is included at a position facing the facing portion 50 in the wiper carriage 35. Accordingly, a dedicated configuration for moving the edge detection unit 38 in the medium width direction is not necessary, and it is possible to curb an increase in size and cost of the apparatus.

The control unit 80 that controls the wiper drive motor 31 and the head movement motor 81 can drive the wiper drive motor 31 in a state in which the line head 40 is positioned at the wiping position, to perform edge detection using the edge detection unit 38. Hereinafter, this will be referred to as a first edge detection mode.

According to the first edge detection mode, since the wiping of the head surface 42*a* by the wiper 36 and the edge detection using the edge detection unit 38 are simultaneously performed, it is possible to improve a recording throughput.

In addition, the control unit 80 can drive the wiper drive motor 31 to perform edge detection using the edge detection unit 38 in a state in which the line head 40 is positioned at a spaced position. Hereinafter, this will be referred to as a second edge detection mode.

According to the second edge detection mode, when the edge detection is performed, a load due to contact between the wiper 36 and the head surface 42*a* is not applied to the wiper drive motor 31, and it is possible to perform the edge detection with high accuracy.

In addition, the control unit 80 can perform only wiping of the head surface 42*a* using the wiper 36 without the edge detection. Hereinafter, this will be referred to as a wiping only mode.

The wiping of the head surface 42*a* by the wiper 36 can be performed, for example, when the apparatus is powered on or off. In this case, the control unit 80 selects the wiping only mode as an example.

Further, the wiping of the head surface 42*a* by the wiper 36 can be performed at a timing when an elapsed time from a previous wiping of the head surface 42*a* reaches a predetermined time, or at a timing when a total number of printed sheets from the previous wiping of the head surface 42*a* reaches a predetermined number. In this case, the control unit 80 selects the wiping only mode as an example.

In addition, the control unit 80 may perform edge detection on a first medium when a recording job is executed for the first time after the apparatus is powered on. For example, when designated recording quality is "normal", the control unit 80 may perform edge detection on the first medium each time the recording job is executed. In this case, the control unit 80 may perform any of the first edge detection mode and the second edge detection mode.

Further, the control unit 80 may perform the edge detection on the first medium of the recording job each time the recording job is executed. For example, when the designated recording quality is "high definition", the control unit 80 may perform edge detection on the first medium each time the recording job is executed. In this case, the control unit 80 may perform any of the first edge detection mode and the second edge detection mode.

Further, the control unit 80 may perform the mode on a first medium when the recording job is executed for the first time after the medium accommodation cassette 2 is inserted or removed. In this case, the control unit 80 may perform any of the first edge detection mode and the second edge detection mode.

When size information of the medium included in printing data is different from size information of the medium acquired through the edge detection, the control unit 80 stops a recording operation and displays an alert indicating this fact on a display unit (not illustrated) of the printer 1 or a display unit (not illustrated) of a computer coupled to the printer 1.

Next, a rotation stopping structure of the wiper carriage 35 will be described.

Figure 30:
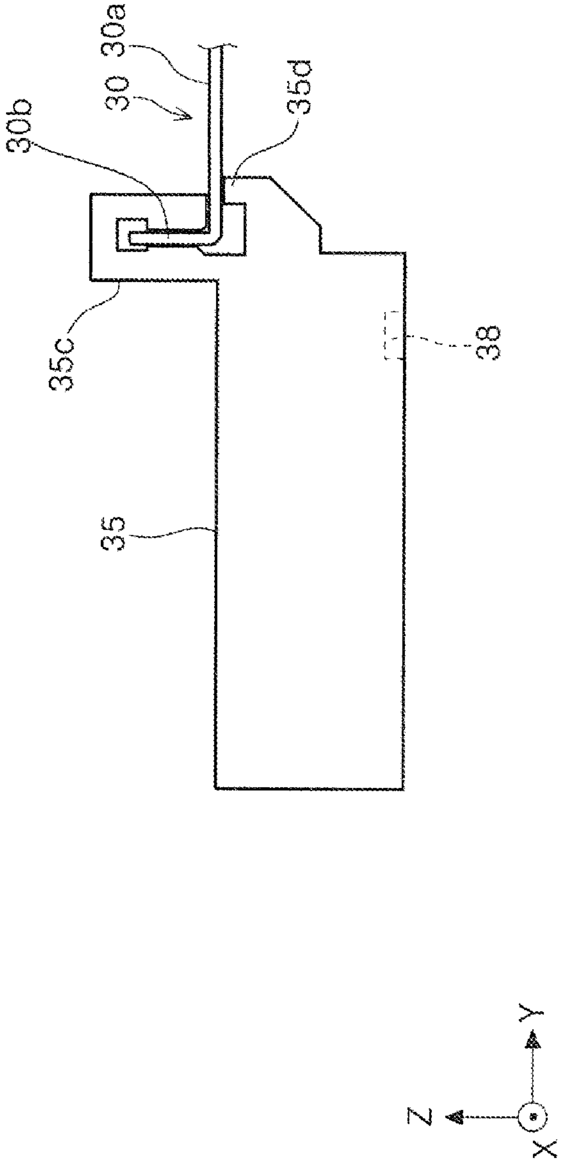
FIG. 30 is a view illustrating another embodiment of the rotation stopping structure of the wiper carriage.

FIG. 30 illustrates the rotation stopping structure of the wiper carriage 35 according to the present embodiment.

The wiper frame 30 includes a first frame portion 30*a* that forms a horizontal surface, and a second frame portion 30*b* that forms a vertical surface. Both the first frame portion 30*a* and the second frame portion 30*b* extend over the entire movement region of the wiper carriage 35.

The wiper carriage 35 includes a guided portion 35*c* that forms a shape that sandwiches the second frame portion 30*b*, and a position of the wiper carriage 35 in the Y-axis direction is prescribed by the guided portion 35*c* sandwiching the second frame portion 30*b*. Further, the guided portion 35*c* comes in contact with an upper surface of the first frame portion 30*a*, and thus, the wiper carriage 35 is supported by the first frame portion 30*a*.

In the wiper carriage 35, a moment to rotate counterclockwise in FIG. 30 around the guided portion 35*c* is generated due to a weight of the wiper carriage 35. A rotation stopping portion 35*d* is formed in the wiper carriage 35, the rotation is stopped by the rotation stopping portion 35*d* coming into contact with a lower surface of the first frame portion 30*a*, so that a posture of the wiper carriage 35 is prescribed.

Figure 31:
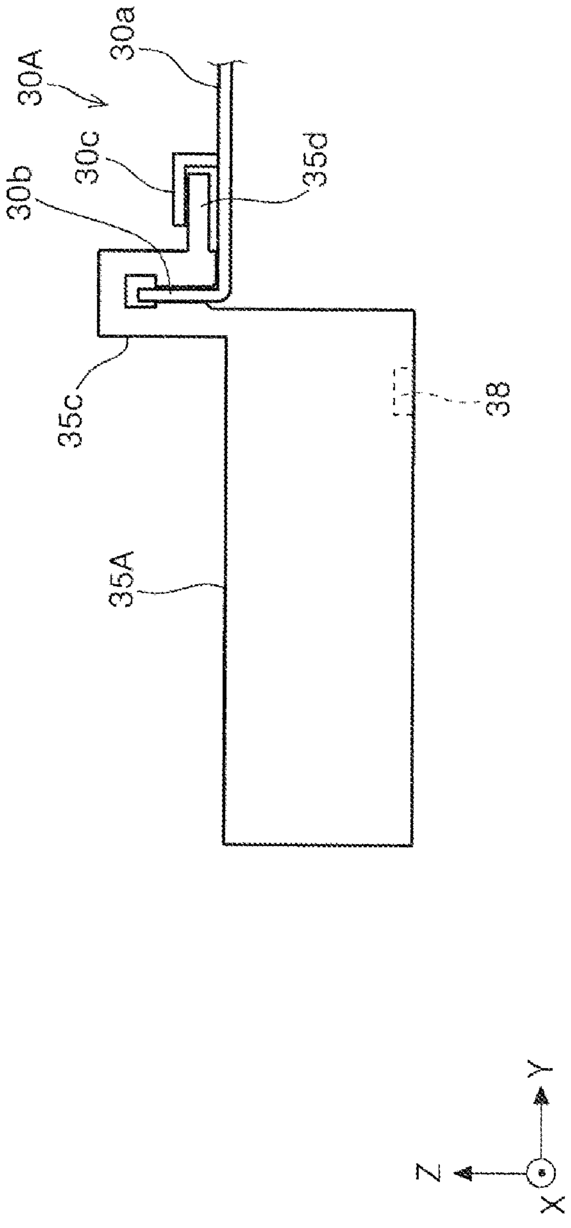
FIG. 31 is a view illustrating another embodiment of the rotation stopping structure of the wiper carriage.

The rotation stopping structure of the wiper carriage 35 as described above can be modified as illustrated in FIG. 31. For example, in the wiper carriage 35A illustrated in FIG. 31, the rotation stopping portion 35*d* is formed to extend in the +Y direction from the guided portion 35*c*.

A rotation regulation portion 30*c* is formed in the first frame portion 30*a* of the wiper frame 30A. The rotation regulation portion 30*c* extends over the entire movement region of the wiper carriage 35.

The rotation stopping portion 35*d* is configured to enter the lower side of the rotation regulation portion 30*c*, so that the rotation of the wiper carriage 35A is stopped and a posture of the wiper carriage 35A is prescribed.

Figure 32:
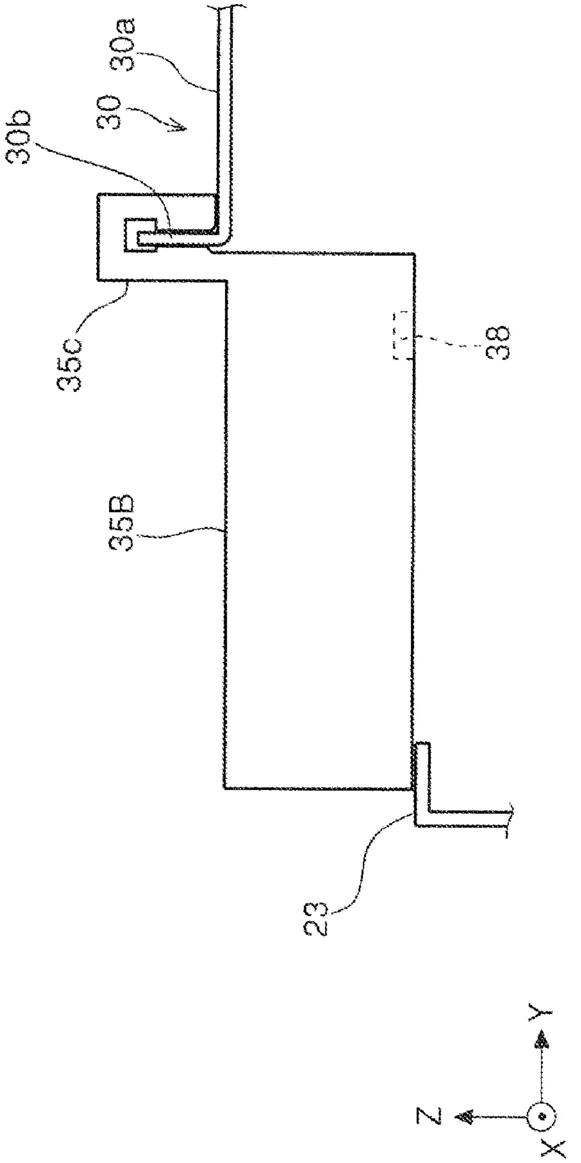
FIG. 32 is a view illustrating another embodiment of the rotation stopping structure of the wiper carriage.

Further, the rotation stopping structure of the wiper carriage can be modified as illustrated in FIG. 32. A sub-frame 23 is provided on the lower side of a −Y direction end portion of the wiper carriage 35B illustrated in FIG. 32. The sub-frame 23 extends over the entire movement range of the wiper carriage 35.

The sub-frame 23 supports the −Y direction end portion of the wiper carriage 35B from a lower side. Accordingly, the rotation of the wiper carriage 35B is stopped so that a posture of the wiper carriage 35B is prescribed.

Figure 33:
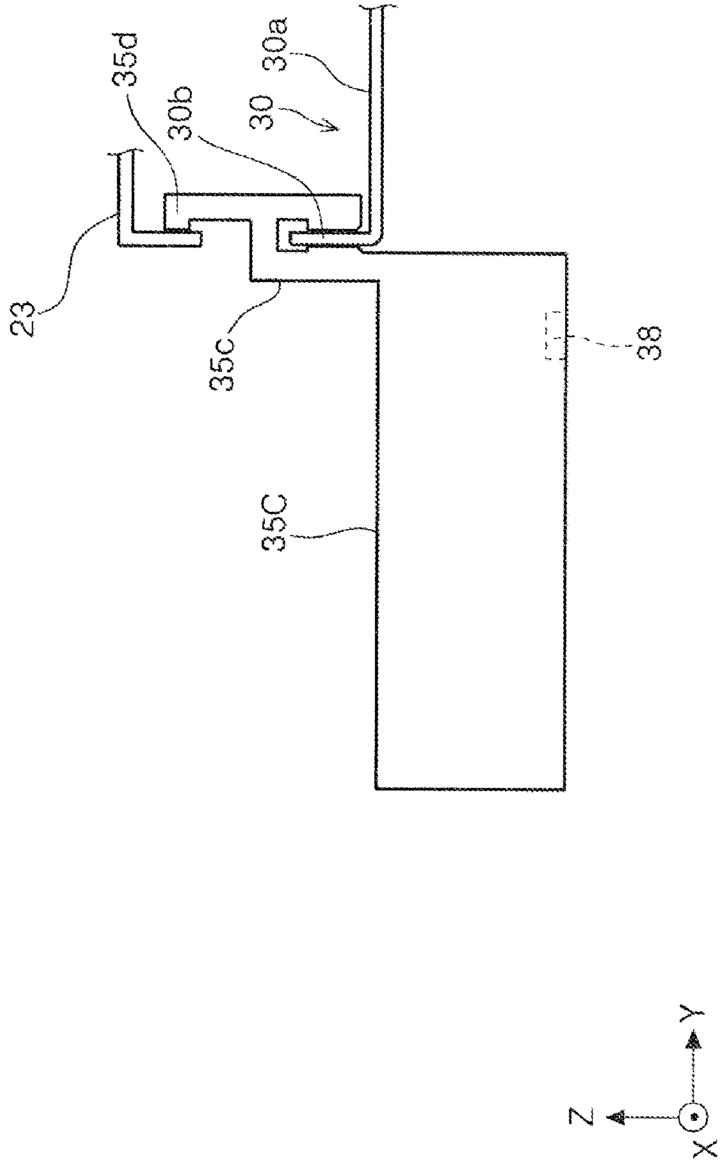
FIG. 33 is a view illustrating another embodiment of the rotation stopping structure of the wiper carriage.

Further, the rotation stopping structure of the wiper carriage can be modified as illustrated in FIG. 33. In a wiper carriage 35C illustrated in FIG. 33, the rotation stopping portion 35*d* is formed to extend in the +Z direction from the guided portion 35*c*.

The sub-frame 23 is provided on the guided portion 35*c*, and the rotation of the wiper carriage 35C is stopped by the rotation stopping portion 35*d* being pressed against the sub-frame 23, so that a posture of the wiper carriage 35C is prescribed.

Figure 34:
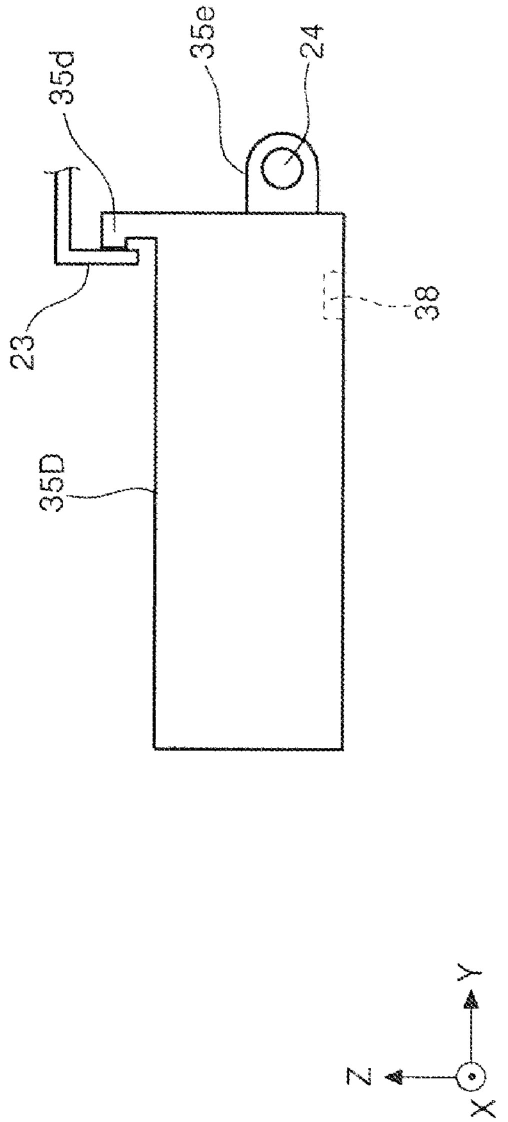
FIG. 34 is a view illustrating another embodiment of the rotation stopping structure of the wiper carriage.

Further, the rotation stopping structure of the wiper carriage can be modified as illustrated in FIG. 34. In a wiper carriage 35D illustrated in FIG. 34, a shaft insertion portion 35*e* is formed, and a guide shaft 24 is inserted into the shaft insertion portion 35*e*. The guide shaft 24 extends over the entire movement range of the wiper carriage 35. The wiper carriage 35D is guided in the X-axis direction by the guide shaft 24.

A sub-frame 23 is provided on the wiper carriage 35D, and the rotation of the wiper carriage 35D is stopped by the rotation stopping portion 35*d* being pressed against the sub-frame 23, so that a posture of the wiper carriage 35D is prescribed.

It is needless to say that the present disclosure is not limited to the embodiments or modification examples described above, and various modifications can be made within the scope of the present disclosure as described in the claims, which also fall within the scope of the present disclosure.

What is claimed is:

1. A recording apparatus, comprising:

a liquid ejection head including a plurality of nozzles configured to eject a liquid onto a medium, the liquid ejection head being elongated in a medium width direction that is a direction intersecting a medium transport direction;

a facing portion disposed to face the liquid ejection head; and a wiper configured to wipe a head surface of the liquid ejection head while moving in the medium width direction, wherein the wiper is provided at a wiper carriage that moves in the medium width direction using power from a first motor, and an edge detection unit for detecting an edge of the medium is included at a position facing the facing unit in the wiper carriage.

2. The recording apparatus according to claim 1, wherein the liquid ejection head is movable in a direction in which the liquid ejection head moves forward and backward with respect to the facing portion using power from a second motor, a movement region of the liquid ejection head includes a recording position at which recording is performed on the medium, and a wiping position that is a position spaced apart from the facing portion as compared to the recording position and at which the head surface is wiped by the wiper, and a control unit configured to control the first motor and the second motor drives the first motor and performs edge detection using the edge detection unit in a state in which the liquid ejection head is positioned at the wiping position.

3. The recording apparatus according to claim 1, wherein the liquid ejection head is movable in a direction in which the liquid ejection head moves forward and backward with respect to the facing portion using power from a second motor, a movement region of the liquid ejection head includes a recording position at which recording is performed on the medium, a wiping position that is a position spaced apart from the facing portion as compared to the recording position and at which the head surface is wiped by the wiper, and a position spaced apart from the facing portion as compared to the wiping position, the position being a spaced position at which the wiper is movable in the medium width direction in a state in which the wiper is spaced apart from the head surface, and a control unit configured to control the first motor and the second motor drives the first motor and performs edge detection using the edge detection unit in a state in which the liquid ejection head is positioned at the spaced position.

4. The recording apparatus according to claim 3, wherein the control unit moves the liquid ejection head from the recording position to the wiping position or the spaced position before the medium is transported to a position at which the medium faces the edge detection unit when the edge detection using the edge detection unit is performed.

5. The recording apparatus according to claim 1, comprising:

a cap portion configured to cover the head surface, wherein an opening portion is formed in the facing portion, the cap portion is disposed at a position that is on the inner side of the opening portion and that faces the head surface, the liquid ejection head is movable in a direction in which the liquid ejection head moves forward and backward with respect to the facing portion using power from a second motor, and a movement region of the liquid ejection head includes a recording position at which recording is performed on the medium, and a cap position at which the head surface is covered by the cap portion.

6. The recording apparatus according to claim 5, wherein the liquid ejection head includes an abutting portion configured to abut on the facing portion, the facing portion is displaceable along a movement direction of the liquid ejection head and is pressed toward the liquid ejection head by a pressing member, and the liquid ejection head is caused to abut on the facing portion at the abutting portion in a process in which the liquid ejection head moves from the recording position to the cap position, and moves the facing portion against a pressing force of the pressing member.

* * * * *